(12) United States Patent
Ichikawa et al.

(10) Patent No.: US 6,356,332 B1
(45) Date of Patent: Mar. 12, 2002

(54) MATRIX SUBSTRATE AND LIQUID CRYSTAL DISPLAY DEVICE USING THE SAME IN WHICH THE DISTANCE BETWEEN THE UPPER SURFACE OF THE PIXELS BEING LESS THAN THE DISTANCE BETWEEN THE LOWER SURFACE OF THE PIXELS IN CONTACT WITH THE SUBSTRATE

(75) Inventors: Takeshi Ichikawa, Hachioji; Katsumi Kurematsu, Hiratsuka; Osamu Koyama, Hachioji, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/172,775

(22) Filed: Oct. 15, 1998

(30) Foreign Application Priority Data

Oct. 24, 1997 (JP) .............................................. 9-292463

(51) Int. Cl.[7] ...................... G02F 1/1343; G02F 1/136; G02F 1/1335
(52) U.S. Cl. ......................... 349/146; 349/42; 349/113; 349/95
(58) Field of Search ........................... 349/158, 95, 42, 349/113, 5, 146

(56) References Cited

U.S. PATENT DOCUMENTS

| | | | | |
|---|---|---|---|---|
| 5,355,251 A | * | 10/1994 | Parks | ........................ 359/354 |
| 5,552,911 A | * | 9/1996 | Okada et al. | .................. 359/68 |
| 5,592,318 A | * | 1/1997 | Majima et al. | ............. 349/122 |
| 5,680,186 A | * | 10/1997 | Watanable et al. | ............ 349/95 |
| 5,798,805 A | * | 8/1998 | Ooi et al. | ...................... 349/10 |
| 5,852,479 A | * | 12/1998 | Ueda et al. | ...................... 349/9 |
| 6,057,897 A | * | 5/2000 | Ichikawa et al. | ............. 349/48 |
| 6,078,371 A | * | 6/2000 | Ichikawa et al. | ............. 349/95 |

FOREIGN PATENT DOCUMENTS

| | | |
|---|---|---|
| EP | 0 112 417 | 7/1984 |
| EP | 0751417 A1 * | 1/1997 |
| JP | 9-73103 | 3/1997 |
| JP | 9-073103 | 3/1997 |

* cited by examiner

Primary Examiner—William L. Sikes
Assistant Examiner—Mike Qi
(74) Attorney, Agent, or Firm—Fitzpatrick, Cella, Harper & Scinto

(57) ABSTRACT

A matrix substrate includes a plurality of conductive members constituting pixels provided on a substrate, the plurality of conductive members forming substantially a smooth plane, wherein the matrix substrate further comprises a nonconductive section for insulating the plurality of conductive members from each other, the distance between two adjacent conductive members being lower at the surfaces of the conductive members than at the side of the substrate.

32 Claims, 27 Drawing Sheets

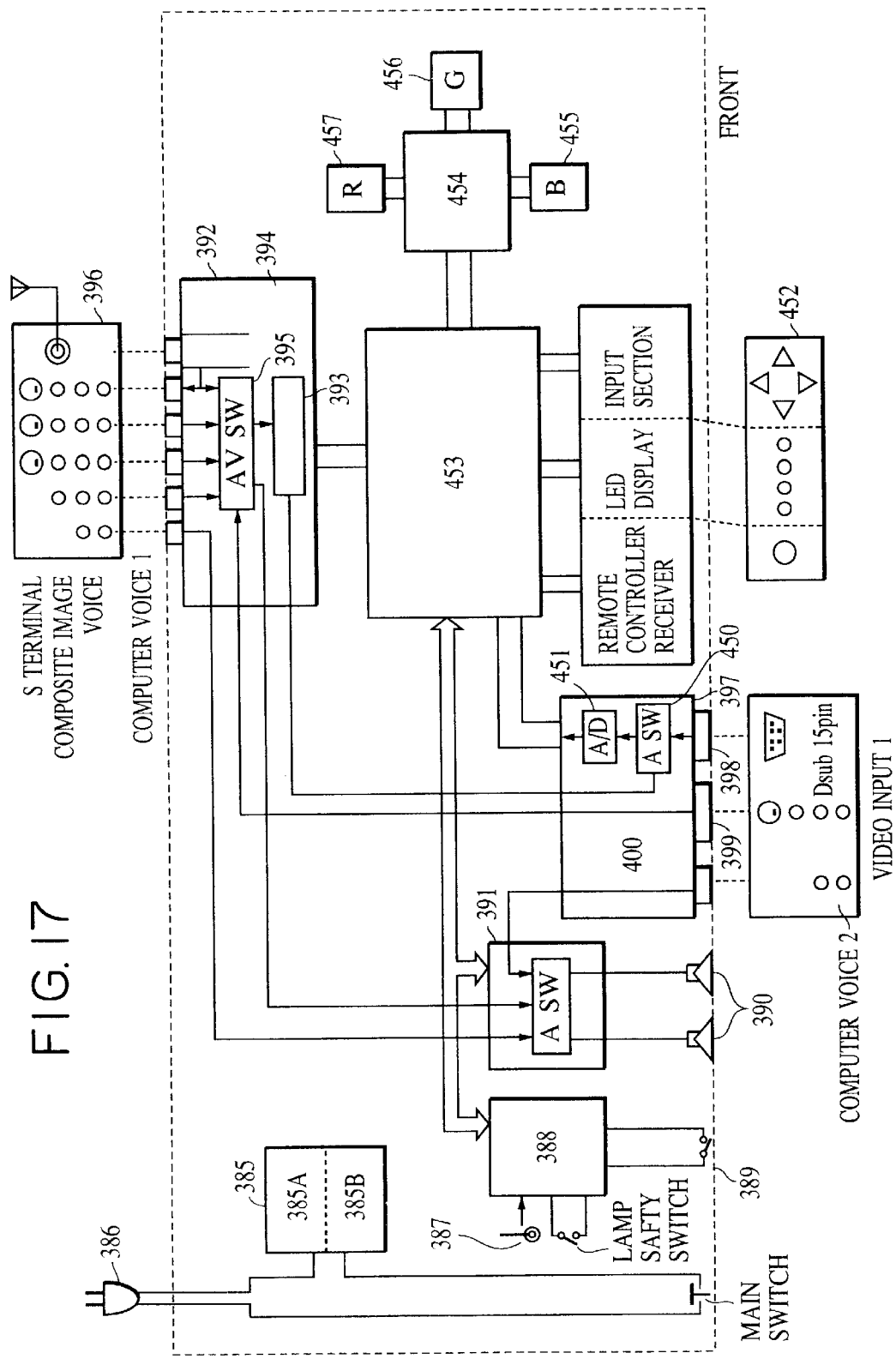

1342: SPECTRAL REFLECTANCE OF B-REFLECTING DICHROIC MIRROR

1341: SPECTRAL REFLECTANCE OF B/G-REFLECTING DICHROIC MIRROR

1340: SPECTRAL REFLECTANCE OF R-REFLECTING DICHROIC MIRROR

IMAGE/CONTROL SIGNALS

AN RGB MIXED COLOR

| R | G | B | R | G | B | R | G | B | R | G | B |
|---|---|---|---|---|---|---|---|---|---|---|---|
| R | G | B | R | G | B | R | G | B | R | G | B |
| R | G | B | R | G | B | R | G | B | R | G | B |
| R | G | B | R | G | B | R | G | B | R | G | B |
| R | G | B | R | G | B | R | G | B | R | G | B |

MATRIX SUBSTRATE AND LIQUID CRYSTAL DISPLAY DEVICE USING THE SAME IN WHICH THE DISTANCE BETWEEN THE UPPER SURFACE OF THE PIXELS BEING LESS THAN THE DISTANCE BETWEEN THE LOWER SURFACE OF THE PIXELS IN CONTACT WITH THE SUBSTRATE

BACKGROUND OF THE INVENTION

1. Field of the Invention

The present invention relates to matrix substrates used in liquid crystal devices and to liquid crystal display devices using the matrix substrates.

2. Description of the Related Art

Recent progress in information networks increasingly requires display devices for communication of information, particularly image information. Liquid crystal display devices, which are thin and have an advantage in low electrical power consumption, have attracted considerable attention and are growing as one of the basic industries, similarly to the semiconductor industries. Recently, liquid crystal display devices are mainly used in 12" notebook personal computers. In the future, liquid crystal display devices having larger screen sizes will be used in workstations and home televisions, as well as in personal computers. Trends of increasing scale in liquid crystal display devices, however, demands the introduction of expensive apparatuses for producing such devices. Further, large scale liquid crystal display devices must have extreme electrical characteristics for driving large screens. Thus, production costs increase significantly, that is, are in proportion to from the square to the cube of the screen size.

A front- or rear-projection system using a small liquid crystal display panel has recently attracted attention in which a liquid crystal image is optically enlarged and displayed. Performance and production costs of liquid crystal display devices are improved with size reduction in the devices by the scaling rule as in semiconductors. In TFT liquid crystal display panels, TFTs using polycrystalline Si are being substituted for those using amorphous Si to meet the requirement of small TFTs having high driving force. Image signals having a resolution level in the NTSC standard do not require high-speed processing.

A possible TFT liquid crystal display device which can be used to meet such requirements has an integrated structure including a display region and peripheral driving circuits, such as a shift register and a decoder, which are also formed of polycrystalline Si. Polycrystalline Si, however, is not comparable to single crystal Si. When a display of an extended graphics array (XGA) or super extended graphics array (SXGA) class in the resolution standard of computers is designed, for example, the shift register must inevitably be divided into a plurality of segments. Signal noise (ghosting) will occur in the display region corresponding to the boundary between the segments. Countermeasures are required for solving such problems.

Display devices using single-crystal Si substrates have attracted attention in place of integrated polysilicon display devices, since transistors in their peripheral driving circuits have significantly high driving characteristics, and thus, the single-crystal devices do not require divisional arrangements which are essential for polysilicon display devices. Signal noise due to the divisional arrangements does not occur in single-crystal devices.

The present inventors have disclosed reflection-type liquid crystal display devices using a poly-crystalline substrate and a single crystal Si substrate in Japanese Patent Laid-Open No. 9-73103. The technology solves a problem of reduction in light reflectance by random scattering at pixel electrodes having uneven surfaces and a reduction in contrast by unsatisfactory alignment of the orientation film in the rubbing step and thus by insufficient alignment of the liquid crystal which is caused by such uneven surfaces. Chemical mechanical polishing (hereinafter referred to as CMP) is employed to form all pixel electrodes each having a mirror surface in the same plane. Thus, this reflection-type liquid crystal display device, free of random light scattering and insufficient alignment, can display high-quality images.

The method for making an active matrix substrate for the reflection-type liquid crystal display device disclosed in Japanese Patent Laid-Open No. 9-73103 will now be described with reference to FIG. 32. Although FIG. 32 shows a pixel region, peripheral driving circuits such as shift registers for driving switching transistors in the pixel region can also be formed on the same substrate.

An n-type silicon semiconductor substrate 201 having an impurity concentration of $10^{15}$ cm$^{-3}$ or less is subjected to local thermal oxidation to form a LOCOS (local oxidation of silicon) layer 202, and boron ions are implanted in a dose of approximately $10^{12}$ cm$^{-2}$ through the LOCOS layer 202 as a mask to form a PWL 203 being a p-type impurity region having an impurity concentration of $10^{16}$ cm$^{-3}$. The substrate 201 is thermally oxidized to form a gate oxide film 204 having a thickness of 1,000 angstroms or less (FIG. 32A).

An n-type polysilicon gate electrode 205 is formed by doping phosphorus in an amount of approximately $10^{20}$ cm$^{-3}$; phosphorus ions are implanted onto the entire surface of the substrate 201 in a dose of approximately $10^{12}$ cm$^{-2}$ to form an NLD 206 being an n-type impurity region having an impurity concentration of $10^{16}$ cm$^{-3}$. Phosphorus ions are implanted through a patterned photoresist mask at a dose of approximately $10^{15}$ cm$^{-2}$ to form source and drain regions 207 and 207' having an impurity concentration of approximately $10^{19}$ cm$^{-3}$ (FIG. 32B).

A phospho-silicate glass (PSG) film 208, which is a phosphorus-doped oxide film, is formed as an interlayer on the entire substrate 201. The PSG film 208 can be replaced with a nondoped silicate glass (NSG)/boro-phospho-silicate glass (BPSG) film or a tetraethoxysilane (TEOS) film. Contact holes are patterned into the PSG film 208 just above the source and drain regions 207 and 207'. Aluminum is deposited by a sputtering process and then patterned to form an aluminum electrode 209 (FIG. 32C). It is preferred that a barrier metal composed of Ti or TiN be formed between the aluminum electrode 209 and the source and drain regions 207 and 207' so as to improve the ohmic contact characteristics between the aluminum electrode 209 and the source and drain regions 207 and 207'.

A plasma SiN film 210 with a thickness of approximately 3,000 angstroms, and then a PSG film 211 with a thickness of approximately 10,000 angstroms, are formed on the entire substrate 201 (FIG. 32D). The PSG film 211 is patterned using the plasma SiN film 210 as a dry etching stopper layer so as to leave the separation region between pixels, and then a thorough hole 212 is patterned just above the aluminum electrode 208 which is in contact with the drain region 207' by dry etching (FIG. 32E).

A pixel electrode 213 with a thickness of approximately 10,000 angstroms or more is formed on the substrate 201 by sputtering or electron beam (EB) deposition (FIG. 32F). The pixel electrode 213 is composed of a metal film of aluminum, titanium, tantalum or tungsten, or a metal compound film of such a metal. The surface of the pixel electrode 213 is polished by CMP (FIG. 32G).

An alignment film 215 is formed on the resulting active matrix substrate, and its surface is subjected to alignment treatment such as rubbing. The substrate is bonded with a counter substrate with a spacer (not shown in the drawing) therebetween, and a liquid crystal 214 is injected into the gap to form a liquid crystal device (FIG. 32H). The counter electrode includes a transparent substrate 220, a color filter 221, a black matrix 222, a common electrode composed of ITO, and an alignment film 215', in that order.

The reflection-type liquid crystal device is driven as follows. Peripheral circuits including a shift register which is formed on the substrate 201 by an on-chip process applies a signal potential to the source region 207 and a gate potential to the gate electrode 205 such that the switching transistor in the pixel in an ON state supplies signal charge to the drain region 207'. The signal charge is accumulated in a pn-junction cavity capacitor formed between the drain region 207' and the PWL 203 to impart a potential to the pixel electrode 213 through the aluminum electrode 209. The potential application to the gate electrode 205 is suspended when the potential of the pixel electrode 213 reaches a given value so that the pixel switching transistor is in an OFF state. The signal charge accumulated in the pn-junction capacitor fixes the potential of the pixel electrode 213 before the pixel switching transistor is redriven. The fixed potential of the pixel electrode 213 drives the liquid crystal 214 encapsulated between the substrate 201 and the counter substrate 220 shown in FIG. 32H.

The pixel electrode 213 of the active matrix substrate has a smooth surface as shown in FIG. 32H, and an insulating layer is embedded into the gap between two adjacent pixel electrodes. Thus, the alignment film 215 formed thereon has a smooth surface, which prevents a decrease in light efficiency due to light scattering, a decrease in contrast due to insufficient rubbing, and the formation of an emission line due to a horizontal electric field formed by a step between two pixel electrodes. As a result, the quality of the displayed image is improved.

This reflection-type liquid crystal display device, however, requires further improvements, according to the research by the present inventors. In the reflection-type liquid crystal display device, two adjacent reflecting electrodes are connected to each other by capacitive coupling. The capacitance increases in some cases when the distance between the two adjacent electrodes is increased to increase the aperture ratio. Thus, the potential of the reflecting electrode significantly changes with a change in the potential of the adjacent reflecting electrodes by capacitive coupling and the capacitance between the reflecting electrodes with the capacitance of the pixel itself.

SUMMARY OF THE INVENTION

Accordingly, it is an object of the present invention to provide a reflection-type liquid crystal display device having a high aperture ratio which stabilizes the pixel potential, precisely controls the voltage applied to the liquid crystal, and displays a high-quality image.

A first aspect of the present invention is a matrix substrate comprising a plurality of conductive members constituting pixels provided on a substrate, the plurality of conductive members forming substantially a smooth plane, wherein the matrix substrate further comprises a nonconductive section for insulating the plurality of conductive members from each other, the distance between two adjacent conductive members being lower at the surfaces of the conductive members than at the side of the substrate.

A second aspect of the present invention is a liquid crystal display device comprising a matrix substrate having conductive members constituting pixels provided on a substrate, the plurality of conductive members forming substantially a smooth plane, a counter substrate, and a liquid crystal material placed between the plurality of conductive members and the counter substrate, wherein the matrix substrate further comprises a nonconductive section for insulating the plurality of conductive members from each other, and the distance between two adjacent conductive members is lower at the surfaces of the conductive members than at the side of the substrate.

In the present invention, the distance between two adjacent conductive members is lower at the surfaces of the conductive members than at the side of the substrate. Thus, the liquid crystal display device has a large aperture ratio, and fluctuation of the pixel voltage by capacitive coupling between two adjacent pixels is reduced. At a result, the voltage applied to the liquid crystal is precisely controlled and high-quality images are displayed.

Preferably, the ratio H/L of the height of the nonconductive members H to the distance between the two adjacent conductive members H is in a range of 0.2 to 1.0. The yield of the device is thereby improved, and the advantages of the present invention are further improved.

Preferably, in the projection-type liquid crystal display device, one of the plurality of microlenses is provided for each three pixels. High-quality images free of mosaic patterns are thereby displayed.

Further objects, features and advantages of the present invention will become apparent from the following description of the preferred embodiments with reference to the attached drawings.

BRIEF DESCRIPTION OF THE DRAWINGS

FIG. 17 is a block diagram of an interior of a liquid crystal projector according to the present invention;

DESCRIPTION OF THE PREFERRED EMBODIMENT

First Embodiment

Figure 1:
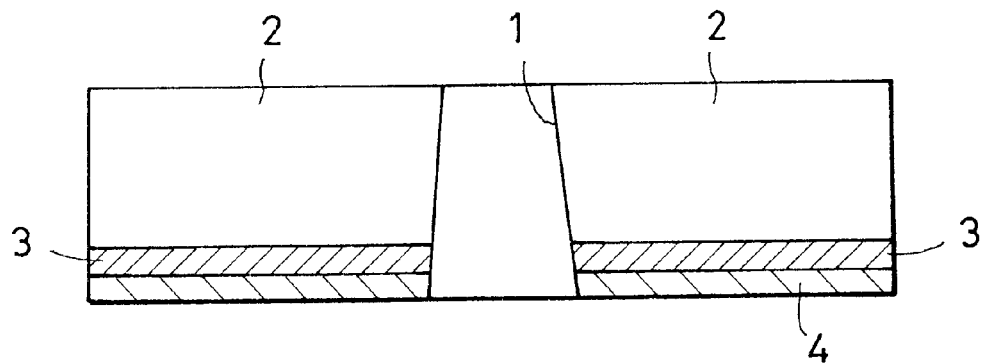
FIG. 1 is a cross sectional view of a reflecting electrode section of a reflection-type liquid crystal display device according to the present invention.
Figure 2:
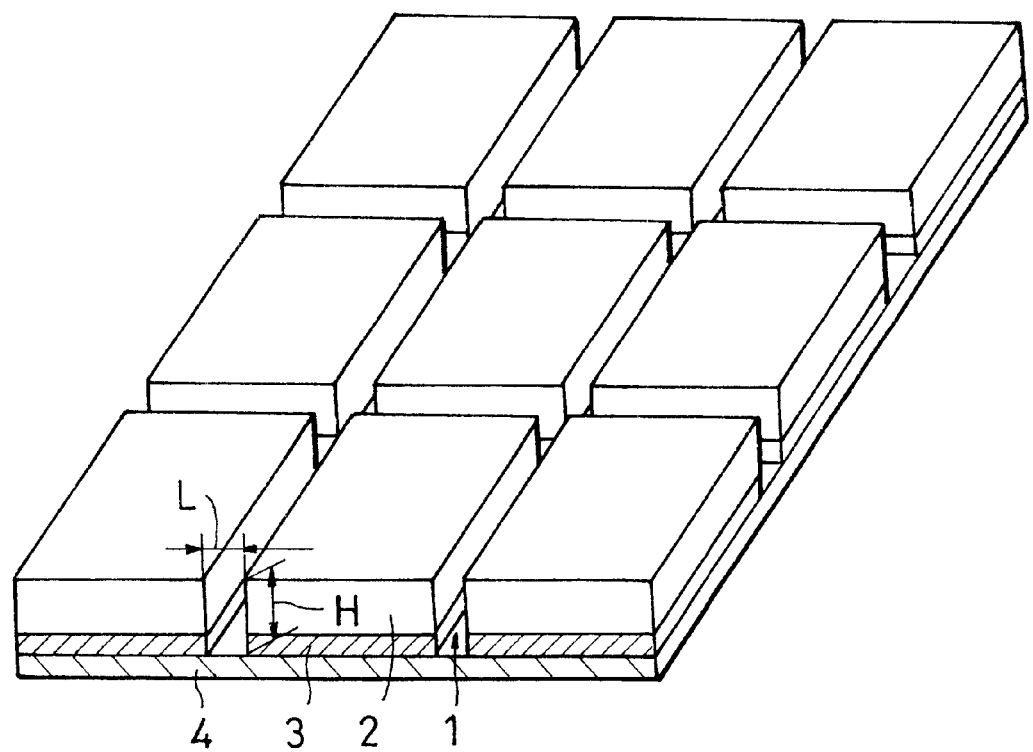
FIG. 2 is an isometric view of a reflecting electrode of a reflection-type liquid crystal display device according to the present invention.

A first embodiment of the present invention will now be described with reference to FIG. 1. FIG. 1 is a cross-sectional view near the pixel section of a liquid crystal panel used in a liquid crystal projector in accordance with the present invention. FIG. 2 is an isometric view of the pixel section of FIG. 1. Reflecting electrodes 2 of pixels are separated from each other by first nonconductive film 1 provided therebetween. Conductive films 4 are provided below the reflecting electrodes 2. Each conductive film 4 is separated from the reflecting electrodes 2 by a second nonconductive film 3 provided therebetween. The potential of each reflecting electrode 2 varies with the potentials of peripheral pixels by means of capacitive coupling between the reflecting electrode itself and the peripheral pixels. As shown in FIG. 2, a pixel of the liquid crystal device is formed on a reflecting electrode 2.

Figure 3:
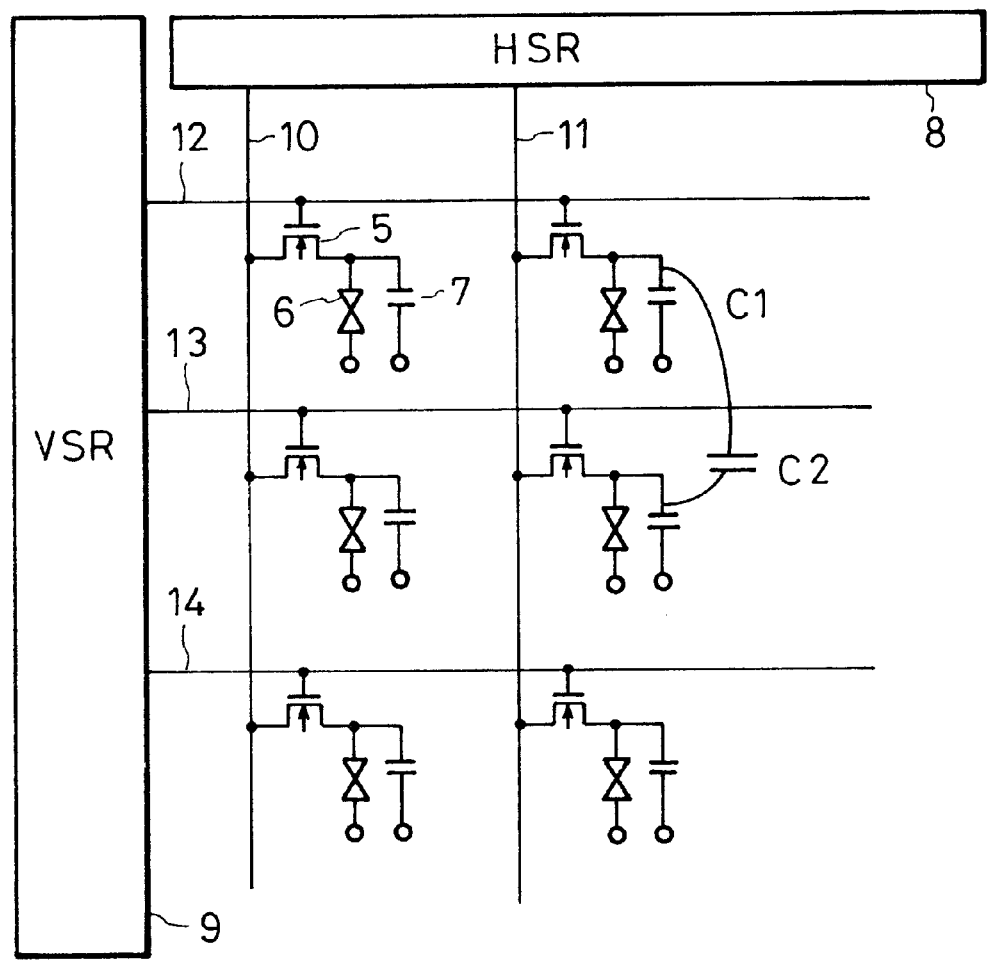
FIG. 3 is a circuit diagram of pixels of a reflection-type liquid crystal display device according to the present invention.

FIG. 3 is a circuit diagram of the liquid crystal display device. A horizontal shift register (HSR) 8 is connected to vertical lines 10 and 11 and controls the horizontal shift of signals, whereas a vertical shift register (VSR) 9 is connected to horizontal lines 12 to 14 and controls the vertical shift of signals. Each pixel switch 5 is composed of an nMOS transistor in the drawing. Alternatively, the pixel switch 5 may be composed of a pMOS transistor, a CMOS transistor, or a polysilicon TFT. Each pixel is provided with a liquid crystal 6 and a pixel capacitor 7 which is primarily formed of the reflecting electrode 2, the second nonconductive film 3, and the conductive film 4 shown in FIG. 2.

The capacitance C1 of the pixel capacitor 7 is represented by the equation:

$$C1 = \epsilon 1 \times S1/d1$$

wherein d1, S1, and ϵ1 are the thickness, the area, and the dielectric constant, respectively, of the nonconductive film 3.

The capacitance C2 between the pixel and the adjacent pixel (hereinafter referred to as an inter-pixel capacitance) is represented by the equation:

$$C2 = \epsilon 2 \times H \times L/d2$$

wherein d2 is the distance between the adjacent electrodes or inter-electrode distance, H is the height of the nonconductive film 1, L is a side of the reflecting electrode, and ϵ2 is the dielectric constant of the nonconductive film 1.

When the amplitude of the pixel potential is V, a change in potential by capacitive coupling between two adjacent pixels is represented by the equation:

$$\Delta V = V \times C2/(C1+C2)$$

Thus, the relationship C1>C2 must be satisfied for reducing such a change (ΔV).

In this embodiment, V=25 volts, the nonconductive film 3 as the pixel capacitor 7 is formed of a silicon nitride film (ϵ1), and the nonconductive film 1 is formed of a silicon oxide film (ϵ2). Thus, ϵ1=7 and ϵ2=3.9. The square reflecting electrode has a side of 20 μm, the inter-electrode distance d2 is 1 μm, and the thickness of the silicon nitride film is 0.2 μm.

Figure 4:
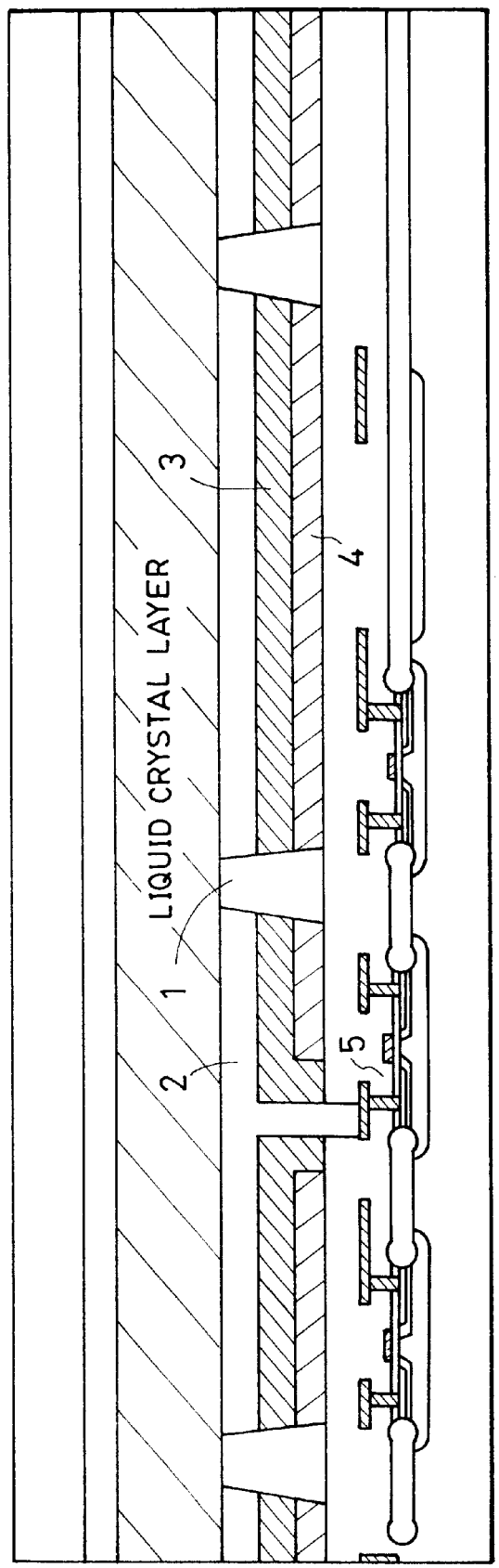
FIG. 4 is a cross-sectional view of a reflection-type liquid crystal display device according to the present invention.

The nonconductive film 1 has a characteristic shape in this embodiment. The width of the nonconductive film 1 between the reflecting electrodes, in other words, the inter-electrode distance has the minimum at the surface of the reflecting electrode and the maximum at the opposite side, that is, at the bottom face of the reflecting electrode. The minimum distance at the surface contributes to a large aperture ratio of the display device, while the maximum distance at the bottom face contributes to a reduced inter-pixel capacitance. Thus, the display device can display a high-quality bright image. FIG. 4 is a cross-sectional view of the liquid crystal panel provided with the conductive film 4 as the shading layer. The conductive film 4 is generally composed of titanium, and may also be composed of titanium nitride, metallic aluminum, alluminum compounds such as aluminum silicide, molybdenum, and tungusten. The reflecting electrodes 2 are separated from each other by the second nonconductive film 3 and the first nonconductive film 1.

A method for forming the second nonconductive film 3 on the first nonconductive film 1 will now be described. In this embodiment, the first nonconductive film 1 is deposited by a plasma $SiO_2$ process under the following conditions:

$SiH_4$: 200 sccm $N_2O$: 6,000 sccm $N_2$: 3,150 sccm

Pressure: 1.8 Torr

Temperature: 400° C.

Time: 30 seconds

A silicon oxide film with a thickness of approximately 1.4 μm is thereby deposited.

A resist is applied and patterned by post baking at a slightly high temperature of 130° C. so that the resist is tapered only at a lower half portion.

The silicon oxide film is etched to form first nonconductive film 1 under the following conditions:

$CF_4$: 60 sccm

Ar: 1,000 sccm

Pressure: 1.0 Torr

Power: 750 W

Time: 2 minutes

The width of the silicon oxide first nonconductive film 1 is 0.8 μm at the surface of the reflecting electrodes 2 and 1.2 μm at the bottom of the reflecting electrodes 2. The inter-pixel capacitance is substantially equalized to the inter-pixel capacitance when the width is 1 μm and the first nonconductive film 1 is not tapered. The second nonconductive film 3 is formed of a silicon nitride film in this embodiment. When the thickness of the silicon nitride film is 0.2 μm, C1=124 fF (femto-Farads), C2=0.35 fF, and V=25 V, ΔV=70.3 mV. Thus, ΔV/V=0.3% is obtained. This value indicates that the image is not substantially affected.

Another factor to suppress a change in potential due to capacitive coupling is dielectric constants of the first nonconductive film 1 and the second nonconductive film 3. Different materials for these nonconductive films are used to control their dielectric constants. The above-mentioned relationship between the inter-electrode distance and the thickness of the reflecting electrodes 2 is essential for accurate control of the potential applied to the liquid crystal and display of high-quality images.

Examples of materials, other than the silicon oxide film, for the first nonconductive film 1 include insulating films, such as a silicon nitride film, a PSG film, a BPSG film, a TEOS film, a SiON film, and a tantalum oxide film. Insulating films containing silicon atoms are preferably used since they can be readily formed by a conventional process for semiconductor production.

Examples of materials for the reflecting electrodes 2 include metals, e.g. aluminum, molybdenum, tungsten, copper, and titanium; and alloys, e.g. AlSi, TiN, AlCuSi, AlCu, and AlGeCu. The reflecting electrodes 2 are generally formed by a vapor deposition process or a sputtering process.

Each pixel has a square shape having a side of 20 μm. Thus, the aperture ratio is 19.2×19.2/(20×20)=92%. This aperture ratio is 2% higher than the ratio (90%) when the inter-electrode distance is 1 μm. As a result, the brightness of the liquid crystal display device will increase by 2%.

Figure 9:
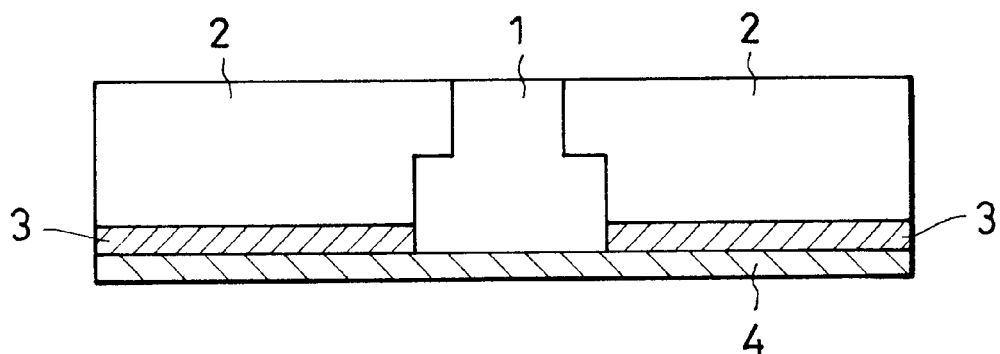
FIG. 9 is a cross-sectional view of a reflecting electrode section of a reflection-type liquid crystal display device according to a first embodiment of the present invention.

FIG. 9 shows another embodiment for achieving compatibility of a high aperture ratio and a low inter-pixel capacitance. In these embodiments, the first nonconductive film 1 has a width of 0.8 mm at the surface and an average width of 1.2 mm at the bottom.

Although the first embodiment was described with reference to a reflection-type liquid crystal display device, this embodiment is also applicable to a transmission-type liquid crystal display device.

Second Embodiment

Figure 5:
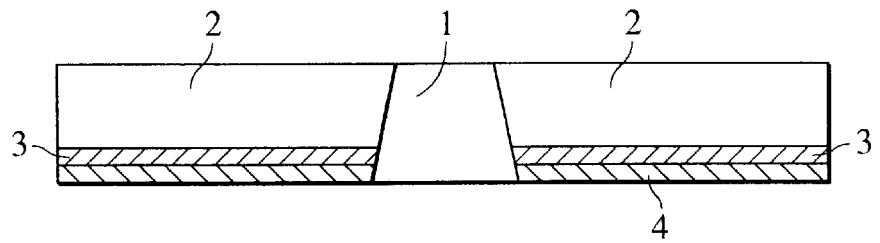
FIG. 5 is a cross-sectional view of a reflecting electrode section of a reflection-type liquid crystal display device according to a second embodiment of the present invention.

A second embodiment will now be described in detail with reference to FIG. 5. FIG. 5 is a cross-sectional view of a pixel section of a liquid crystal panel used for a liquid crystal projector. The basic configuration in this embodiment is the same as that in the first embodiment. Reflecting electrodes 2 constituting pixels and a underlying conductive film 4 are insulated from each other by first nonconductive film 1 provided therebetween and by a second nonconductive film 3 provided under the reflecting electrodes 2.

The second embodiment also has the isometric configuration as shown in FIG. 2. The potential of the reflecting electrodes 2 shifts from the fixed value with the potentials of the adjacent pixels by capactive coupling between the pixel capacitance and the inter-electrode capacitance. The ratio W of the height H to the width H of the first nonconductive film 1 is the most characteristic parameter for determining the performance of the liquid crystal display device. An increased ratio (W) causes increased inter-electrode or inter-pixel capacitance and unstabilized formation of the first nonconductive film 1. Thus, the first nonconductive film 1 may cause short-circuiting between the adjacent pixels, resulting in reduced yield of the liquid crystal panel. A decreased ratio (W) causes a decreased aperture ratio and excessive polishing of the reflecting electrodes 2 by CMP, resulting in a decreased yield.

Figure 6:
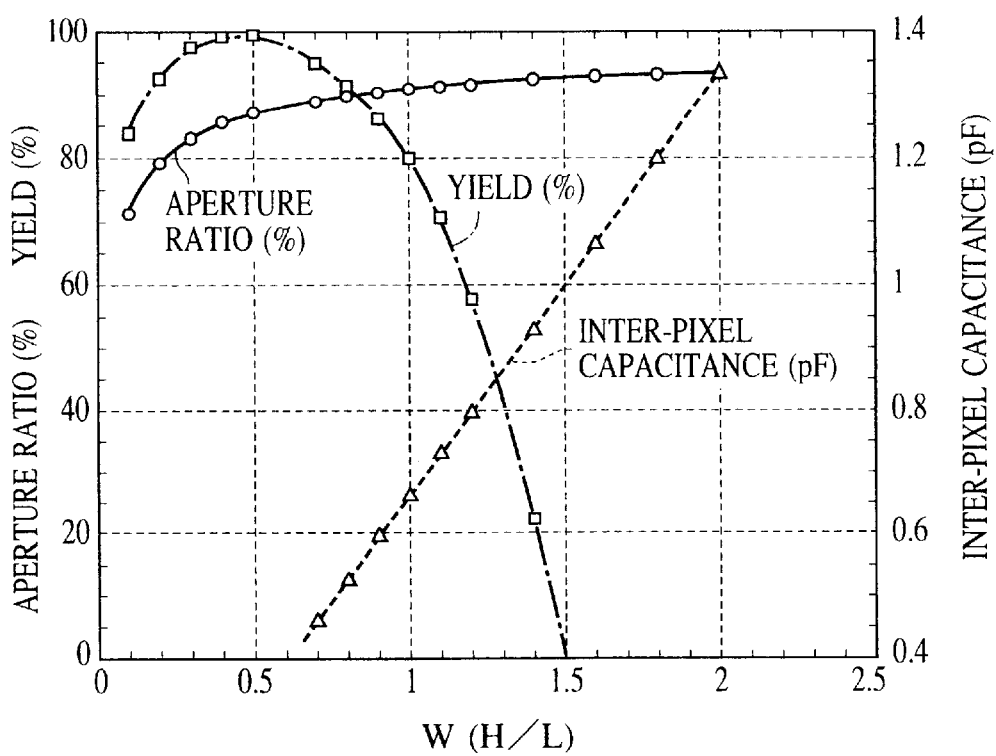
FIG. 6 is a graph showing characteristics of a reflection-type liquid crystal display device according to a second embodiment of the present invention.

FIG. 6 is a graph of relationships between the ratio W and the yield, inter-pixel capacitance or aperture ratio, when the same materials and size as in the first embodiment are employed and the cross-sectional area H×L of the first nonconductive film 1 is fixed to 1 μm$^2$, wherein the width L is an average value. The graph shows that the yield decreases sharply at a ratio W of higher than 1. The Inter-pixel capacitance increases with an increased ratio W. The aperture ratio decreases at a ratio W of less than 0.5. It is preferable from these results that the ratio W be In a range of 0.2 to 1. The most preferred ratio W is approximately 0.5.

Third Embodiment

A third embodiment in accordance with the present invention will now be described with reference to FIG. 4. In this embodiment, a CMOS transistor is used as a pixel switch 5 to secure high speed writing into the pixel. The second nonconductive film 3 as the pixel capacitor is formed of a tantalum oxide film and thus has a high dielectric constant of 20. Thus, the pixel capacitor has a large capacitance. The first nonconductive film 1 is composed of a silicon oxide film as in the first embodiment. Alternatively, the first nonconductive film 1 may be composed of a silicon nitride film or a composite film of a silicon oxide layer and a silicon nitride layer.

Figure 8:
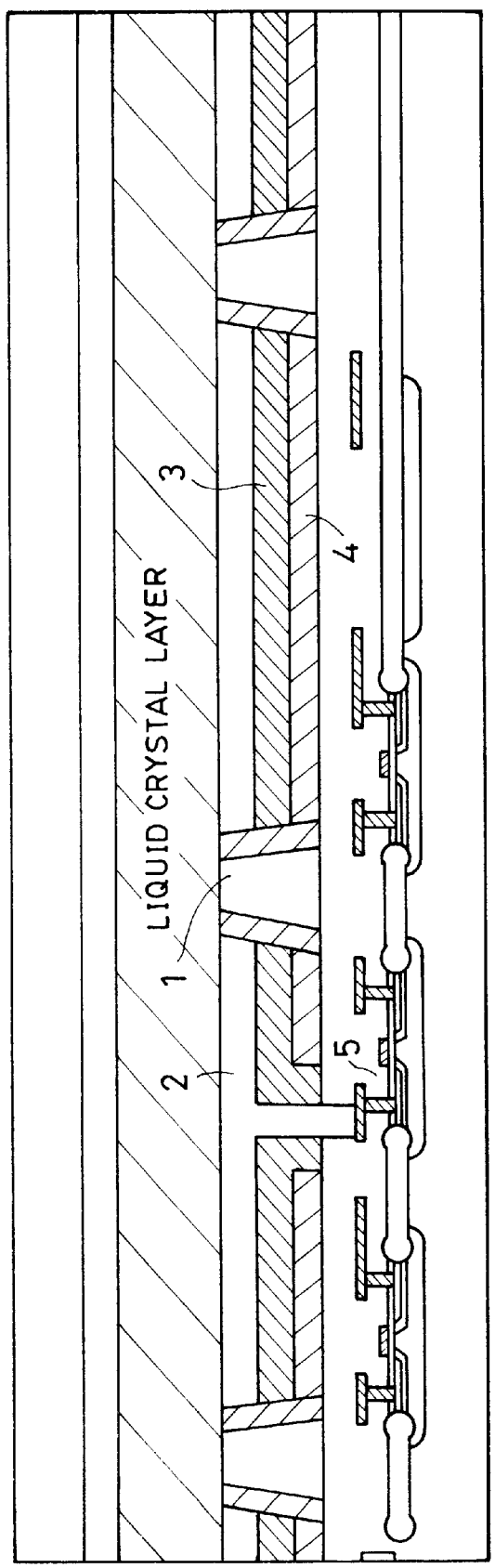
FIG. 8 is a cross-sectional view of a reflection-type liquid crystal display device according to a third embodiment of the present invention.

The third embodiment also includes a configuration shown in FIG. 8, in which the tantalum oxide films 3 are formed on the sides of the first nonconductive film 1, and the films have a small dielectric constant. Since the tantalum oxide film 3 has a high dielectric constant, a relatively high dielectric constant in the first nonconductive film 1 is allowable. Such a composite configuration enables combined use of a material with a low dielectric constant and high leakage and a material with low leakage. In this embodiment, the square reflecting electrodes 2 has a side of 20 $\mu$m, the average inter-electrode distance is 1 $\mu$m, and the thickness of the tantalum oxide film is 0.3 $\mu$m.

Thus, the relationship $d1=0.3$ $\mu$m$<d2=1$ $\mu$m holds. When $C1=236$ fF, $C2=0.35$ fF, and $V=25$ V, $\Delta V=37.0$ mV. Thus, a satisfactory level of $\Delta V/V=0.1\%$ for high quality images is achieved. In the liquid crystal panel satisfying these relationships, the potential applied to the liquid a crystal can be controlled exactly, and a high-quality image is displayed.

In this embodiment, the pixel capacitance is large, and a single-crystal silicon SMOS transistor is used as the pixel switch. Thus, writing into the pixels is significantly stabilized. Further, the potential applied to the liquid crystal is controlled exactly, and a high-quality image is displayed.

Fourth Embodiment

Figure 7:
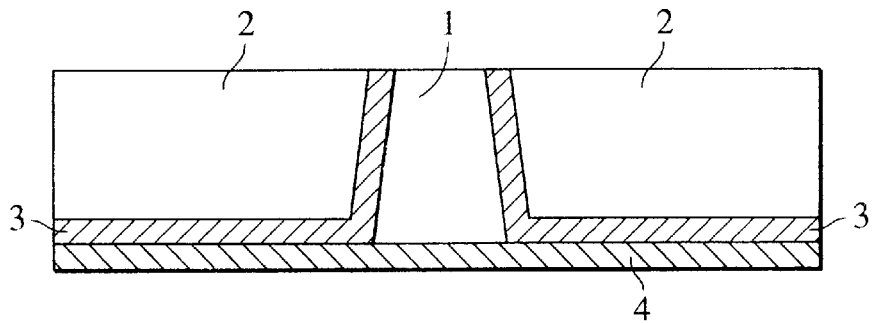
FIG. 7 is a cross-sectional view of a reflecting electrode section of a reflection-type liquid crystal display device according to a fourth embodiment of the present invention.

A fourth embodiment in accordance with the present invention will now be described in detail with reference to FIG. 7 which is a cross-sectional view of a pixel region of a liquid crystal panel used in a liquid crystal projector. In this embodiment, the sides of each reflecting electrode 2 constituting a pixel are surrounded with a composite layer of a first nonconductive film 1 and a second nonconductive film 3. Thus, adjacent reflecting electrodes 2 are insulated from each other by these nonconductive films. Further, a continuous conductive film 4 lies under these nonconductive films, that is, the continuous conductive film 4 is also present under the first nonconductive film 1.

The conductive film 4 reflects the light, which pass through the first nonconductive film 1, so that the underlying semiconductor substrate is not irradiated with the incident light. Thus, this configuration can suppress deterioration of electrical characteristics by light leakage. The first nonconductive film 1 is composed of, for example, a composite film of a silicon oxide film and a silicon nitride film. Other nonconductive films are also applicable to the first nonconductive film 1, as described above.

In this embodiment, a single-crystal silicon CMOS transistor which is used as a pixel switch in order to achieve a high pixel capacitance is protected from light leakage, resulting in stabilized writing into the pixel. Thus, the voltage applied to the liquid crystal is precisely controlled and high-quality images are displayed. In this embodiment, the CMOS transistor may be replaced with a single-side MOS transistor such as an nMOS transistor or a pMOS transistor; or a TFT such as a polysilicon TFT.

Fifth Embodiment

A fifth embodiment in accordance with the present invention will now be described with reference to FIG. 9. Reflecting electrodes 2 as pixels are insulated from each other by a first nonconductive film 1 and second nonconductive films 3. A conductive film 4 is provided under the nonconductive films 3. In the cross-sectional view of FIG. 9, two side walls of the first nonconductive film 1 discretely decrease at an upper half portion. The width is 0.8 $\mu$m at the surface and 1.3 $\mu$m at the bottom. The compatibility of a high aperture ratio and a low capacitance is thereby achieved.

Figure 10:
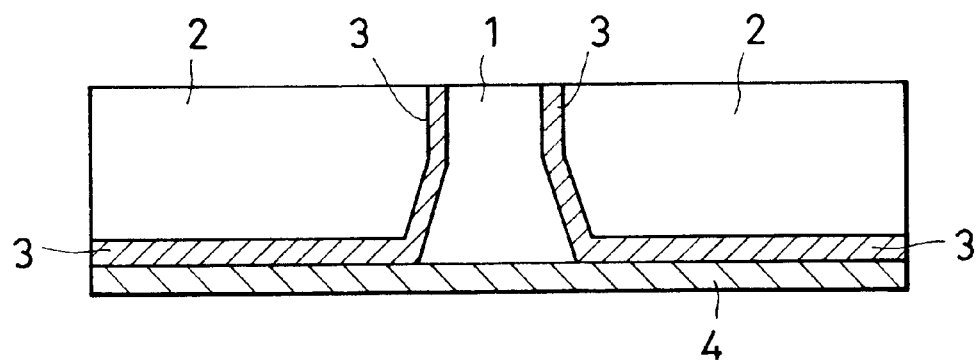
FIG. 10 is a cross-sectional view of a reflecting electrode section of a reflection-type liquid crystal display device according to a fifth embodiment of the present invention.

FIG. 10 shows another cross-sectional configuration of the pixel region of the liquid crystal panel. In the cross-sectional view of FIG. 10, the first nonconductive film 1 is tapered only at a lower half portion and is surrounded with the second nonconductive film 3. This configuration also achieves compatibility of a high aperture ratio and a low capacitance.

In the configurations shown in FIGS. 9 and 10, the surfaces of the reflecting electrodes 2 are planarized by CMP. Since the side of the upper half portion of the first and second nonconductive films 1 and 2 is vertical, the aperture ratio does not change even when the reflecting electrodes 2 are unevenly polished by CMP. On the other hand, the width is increased at the lower half portion to achieve a low capacitance.

Sixth Embodiment

A sixth embodiment comprises a liquid crystal display device having a liquid crystal panel in which the shapes of the reflecting electrodes and the nonconductive films therebetween are optimized and the ratio of the height to the width are optimized.

Figure 11:
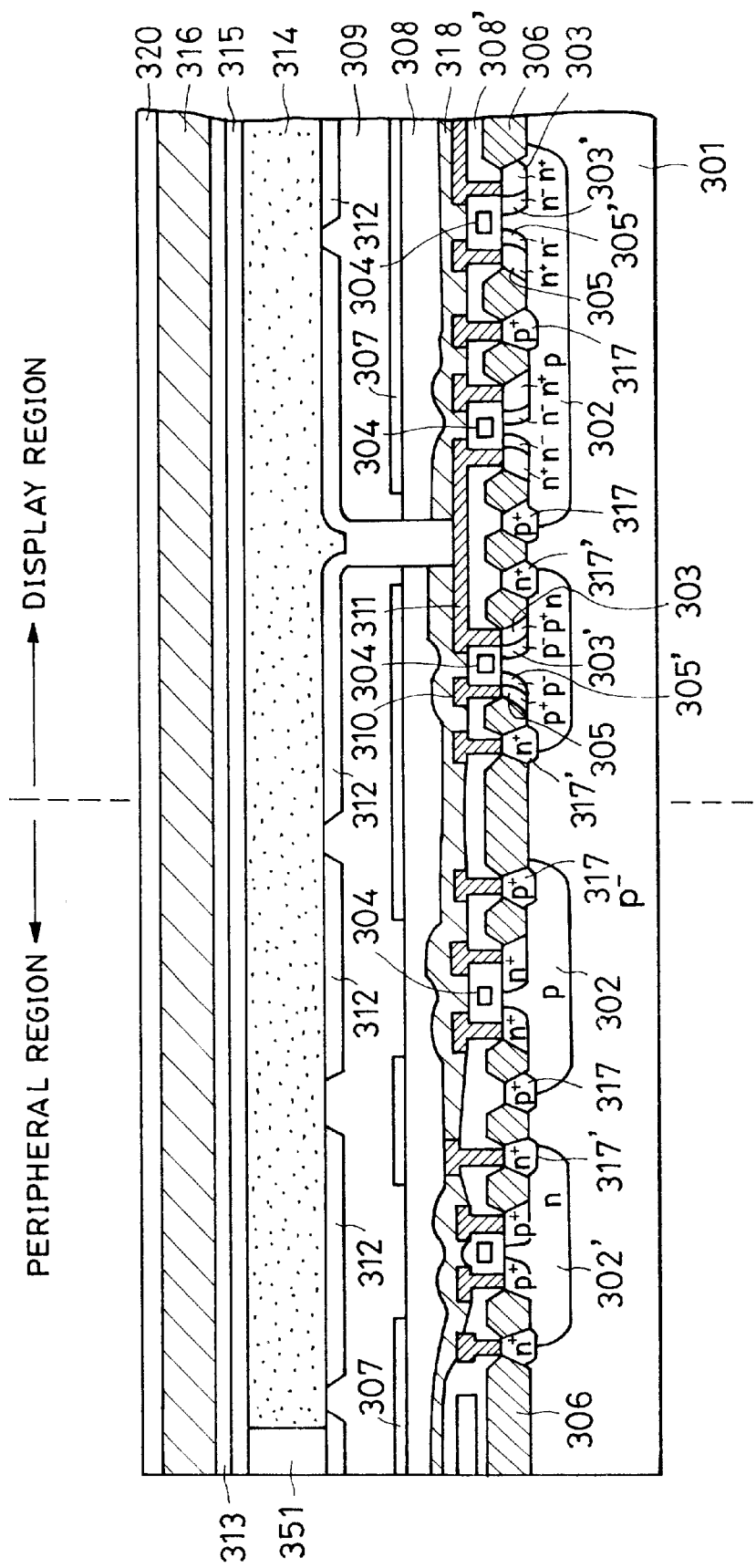
FIG. 11 is a cross-sectional view of a liquid crystal device produced by CMP according to the present invention.

FIG. 11 is a cross-sectional view of the liquid crystal panel in this embodiment. The liquid crystal panel includes a semiconductor substrate 301; p-type wells 302; n-type wells 302'; source regions 303, 303', and 303"; gate regions 404; and drain regions 305, 305', and 305" of transistors.

Figure 12:
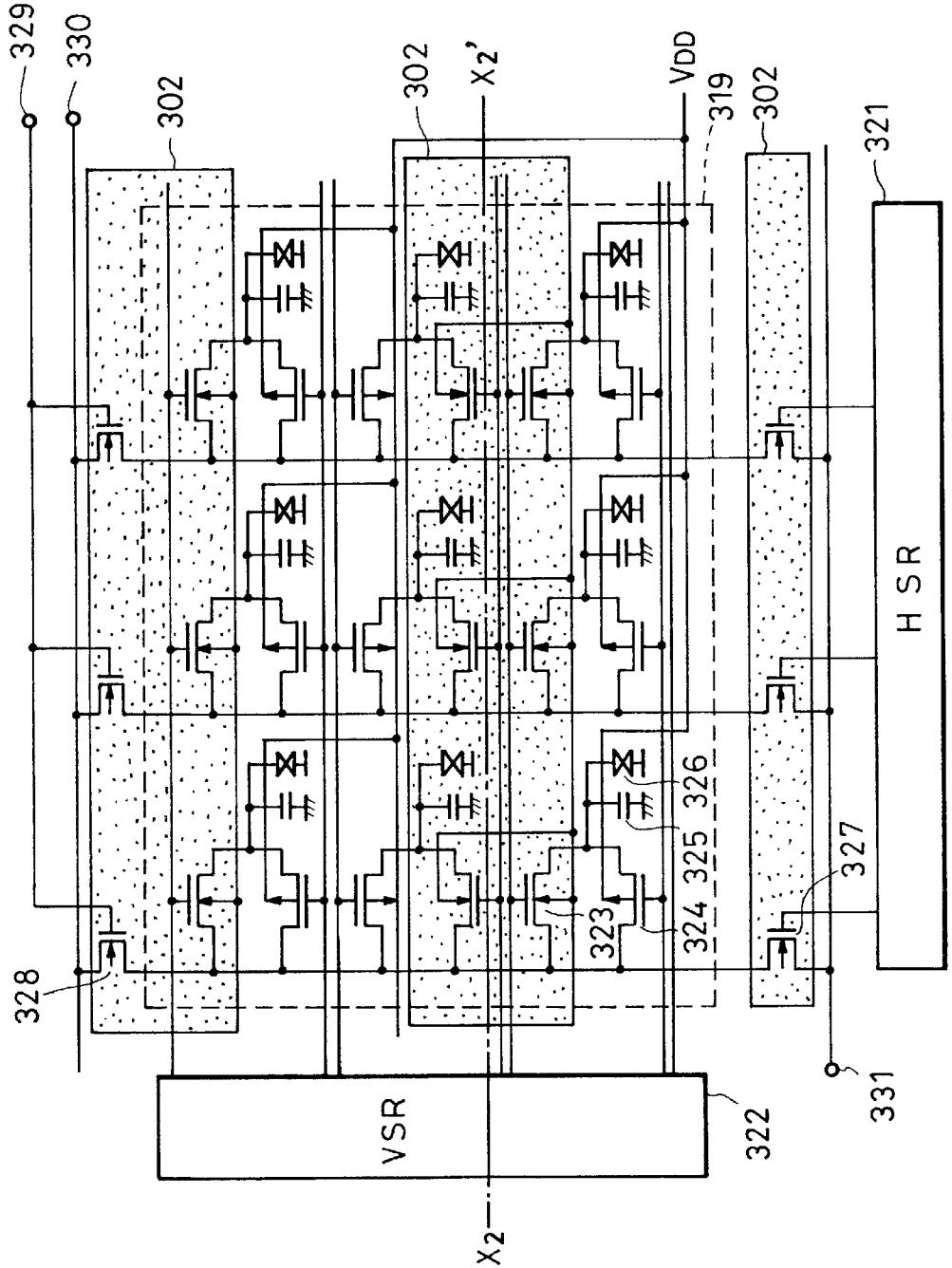
FIG. 12 is a circuit diagram of a liquid crystal device according to the present invention.

Since a high voltage of 20 to 35 V is applied to each transistor of the display region, the source and drain regions are not formed by self-alignment in relation to the gate 304, but are offset. A low concentration of n$^-$-layer 303' and a low concentration of p$^-$-layer 305 are provided therebetween as the source region 303' and the drain region 305', respectively. A preferable offset distance is 0.5 to 2.0 $\mu$m. A part of a peripheral circuit section is shown in FIG. 12. A source layer and a drain layer are formed by self-alignment in the peripheral circuit section.

The offset distance or the gate length may vary depending on the tolerance voltage. Since a part of the peripheral circuit consists of a logic circuit driving at a voltage of 1.5 to 5 V, a self-alignment configuration is employed for the purpose of miniaturization of transistors and improvement in driving characteristics of transistors. The substrate 301 consists of a p-type semiconductor; it has a minimum potential and generally has a standard grounding potential. The p-type well in the display region has a voltage for applying to the pixel in a range of 20 to 35V. A logic driving voltage of 1.5 to 5V is applied to the peripheral logic circuit. The above-mentioned configuration is optimized based on these voltages, and contributes to chip size reduction and high-quality display due to improved driving speed.

With reference to FIG. 11, the liquid crystal panel also includes a field oxide film 306, a source electrode 310 connecting to a data lane, a drain electrode 311 connecting to a pixel electrode, a pixel electrode 312 which also functions as a reflecting mirror, and shading layers 307 and 307' for shading the peripheral region. Examples of materials suitable for the shading layers include titanium, titanium nitride, tungsten and molybdenum. The shading layer 307' under the sealing section is electrically separated from the shading layer 307 under the display region. The shading layer 307 covers the display region other than the connection of the pixel electrode 312 and the drain electrode 311. In a large wiring capacity region, such as video lines and clock lines, of the peripheral pixel region, the shading layer 307 covers the layer of the pixel electrode 312 in order to prevent malfunction of the circuit by leakage of illuminating light. A P-SiO insulating layer 308 under the shading layer 307 is planarized by SOG on a P-SiO layer 318 to secure the stability of the insulating layer 308. Planarization by SOG can be replaced with CMP of the insulating layer 308 of phospho-tetraetoxysilane (P-TEOS) on the P-SiO layer 318.

An insulating layer 309 provided between the reflecting electrode 312 and the shading layer 307 functions as a charge-holding capacitance of the reflecting electrode 312. Materials for forming a large capacitance other than $SiO_2$ have high dielectric constants. Examples of such materials include P-SiN, $Ta_2O_5$, and composite films of $SiO_2$. It is preferable that the insulating layer 309 have a thickness of 500 to 5,000 angstroms.

The liquid crystal panel further includes an antireflection film 313, a liquid crystal 314, a transparent common electrode 315, a counter substrate 316, $p^+$- and $n^+$-type high-impurity regions 317 and 317', a display region 319, and an antireflection film 320. The high-impurity regions 317 and 317' have the same polarity as the wells 302 and 302' formed under the transistors. The well potential is fixed to a desired low voltage through the low-resistance layer and stabilized even when a signal of high amplitude is applied to the source. Thus, the liquid crystal panel can display a high-quality image. The $p^+$- and $n^+$-type high-impurity regions 317 and 317' are provided between the n-type well 302' and the p-type well 302 through a field oxide film. Such a configuration does not require the channel stop layer that is generally provided under the field oxide film in a MOS transistor.

Since the $p^+$- and $n^+$-type high-impurity regions 317 and 317' are simultaneously formed in the source/drain-forming step, such a configuration contributes to production cost reduction because of reduced masks and production steps.

The antireflection film 313 is provided between the transparent common electrode 315 and the counter substrate 316 to reduce the reflectance at the interface in view of the refractive index of the liquid crystal. A preferable anti-reflection film is an insulating film having a refractive index which is lower than that of the counter electrode 316 and that of the transparent electrode 315.

With reference to FIG. 12 which is a plan view illustrating this embodiment, the liquid crystal panel has a horizontal shift register 321, a vertical shift register 322, n-channel MOSFETs 323, p-channel MOSFETs 324, holding capacitors 325, liquid crystal layers 326, signal switches 327, reset switches 328, a reset pulse input terminal 329, a reset electrical power terminal 330, and an image signal input terminal 331. The substrate 301 is a p-type in FIG. 12, but may be an n-type.

The well region 302' has a reverse conductive type to the semiconductor substrate 301. Thus, the well region 302 is a p-type in FIG. 11. It is preferred that the p-type well region 302 and the n-type well region 302' be doped with high concentrations of impurities compared to the semiconductor substrate 301. For example, a preferable impurity concentration in the well region 302 is $10^{15}$ to $10^{17}$ cm$^{-3}$ for an impurity concentration in the semiconductor substrate 301 of $10^{14}$ to $10^{15}$ cm$^{-3}$.

With reference to FIG. 11 again, the source electrode 310 is connected to the data line for transmitting display signals, whereas the drain electrode 311 is connected to the pixel electrode 312. These electrodes are generally composed of Al, AlSi, AlSiCu, AlGeCu or AlCu. A via-metal layer composed of Ti and TiN is provided at the contact face between the lower portions of these electrodes 310 and 311 and the semiconductor to achieve stabilized contact and to reduce the contact resistance. A floating layer and/or a well region as in the first to fifth embodiments may be provided in this embodiment to secure the normal operation when the liquid crystal panel is damaged. Preferably, the pixel electrode 312 has a flat surface and is composed of a high-reflectance material. Examples of preferable materials include chromium, gold, and silver, in addition to conventional wiring metals, such as aluminum, AlSi alloys, AlSiCu alloys, AlGeCu alloys, and AlCu alloys. The underlying insulating layer 309 and the pixel electrode 312 are treated by a CMP process to improve the flatness of these layers.

The holding capacitor 325 in FIG. 12 holds signals between the pixel electrode 312 and the transparent common electrode 315. A substrate potential is applied to the well region 302. This embodiment has the following transmission gate array. At the top line, n-channel MOSFETs 323 lie at the upper portion and p-channel MOSFETs 324 lie at the lower portion, whereas at the second line, p-channel MOSFETs 324 lie at the upper portion and n-channel MOSFETs 323 lie at the lower portion. That is, n-channel MOSFETs 323 and p-channel MOSFETs 324 are alternately arranged at two adjacent lines. These transistors are connected to the electrical power line near the display region through the stripe well and at the display region through a thin electrical power line.

The well resistance must be stabilized. For the p-type substrate, the contact area and sites of the n-type well inside the display region are increased compared to those of the p-type well. The p-type well has a constant potential by the p-type substrate, and the substrate functions as a low-resistance member. The reinforced contact of the n-type well to the upper wiring layer can prevent a significant change in resistance of the well which would be caused by input and output of signals between the n-type well island and the source/drain. Thus, the liquid crystal panel can display a stabilized high-quality image.

Image signals, such as video signals and pulse modulated digital signals, are input through an image signal 40 input terminal 331 and output to each of the data lines while switching a signal switch 327 in response to pulses from the horizontal shift resister 321. The vertical shift register 322 applies a high pulse and a low pulse to the gate of the n-channel MOSFET 323 and the gate of the p-channel MOSFET 324, respectively, of the selected line.

Each of the switches in the pixel region is composed of a single-crystal CMOS transmission gate. Thus, signals can be output to the source independent on the threshold value of the MOSFET. The switch, composed of a single crystal transistor and not having a crystal grain interface, can stabilize the drive of the liquid crystal panel, and thus highly reliable high-speed driving can be achieved.

Figure 13:
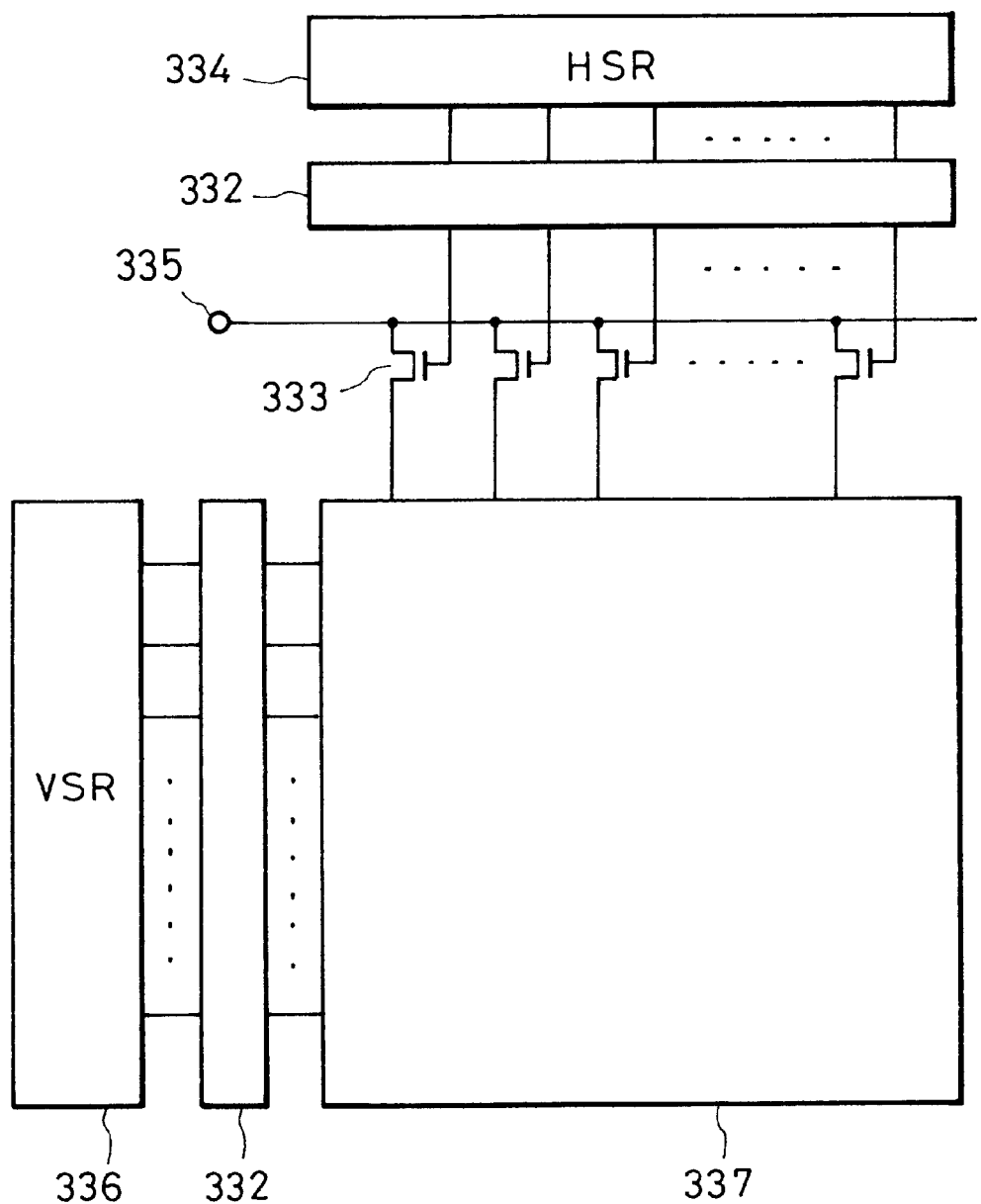
FIG. 13 is a block diagram of a liquid crystal device according to the present invention.

A configuration of the peripheral circuit of the liquid crystal panel will now be described with reference to FIG. 13. The peripheral circuit of the display region 337 includes a level shifting circuit 332, video signal sampling switches 333, a horizontal shift register 334, a video signal input terminal 335, and a vertical shift register 336.

Since the video signal input terminal 335 supplies a voltage of 25 to 30 V, the logic circuits in the horizontal and vertical shift registers 334 and 336 can drive by a significantly low voltage of 1.5 to 5 V. The horizontal and vertical shift registers 334 and 336 enable reciprocal scanning by selection switches. Such registers allow changes in arrangement of the optical system without modification of the panel. Thus, the same type of panel can be used for various types of products, resulting in reduction in production costs. Each video signal sampling switch 333 is composed of a transistor having a single polarity in FIG. 13. The switch may be composed of a CMOS transmission gate which can output all the signals from the video line to the signal line.

In the CMOS transmission gate configuration, video signals may fluctuate due to differences in area between the NMOS gate and the PMOS gate and in overlapping capacitance between the gate and the source/drain. The following configuration can avoid such fluctuations. A MOSFET having a gate area which is approximately ½ the gate area of the MOSFETs of the sampling switches having reverse polarities is provided. The source and drain of the MOSFET is connected to the signal line to apply reversed-phase pulses to the signal line. Thus, the liquid crystal panel can display higher-quality images.

Figure 14:
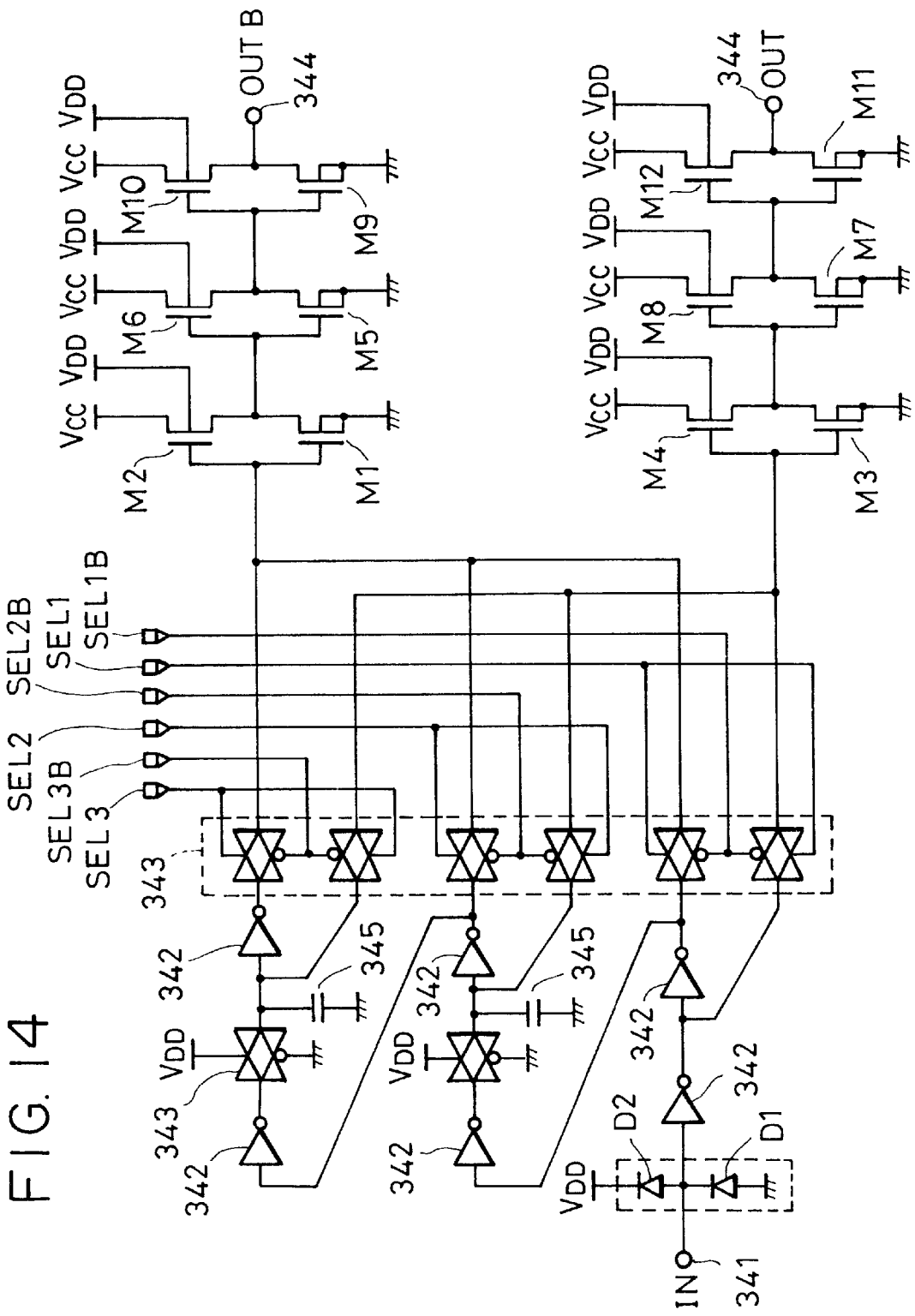
FIG. 14 is a circuit diagram including a delaying circuit of an input section of a liquid crystal according to the present invention.

FIG. 14 is a schematic diagram for illustrating exact synchronizing of the video signals with the sampling pulses by changing the delaying time of the sampling pulses. Delaying inverters 342 are provided for delaying pulses, and switches 343 are provided for determining which delaying inverter 342 is selected. The sampling pulses in which the delaying time is controlled are output through terminals 344. Numeral 345 represents a capacitor, symbols M1 to M11 represent drivers of a MOS configuration, symbol OUT B represents a reverse phase output to the input, symbol OUT represents a normal phase output, and numeral 345 represents a protective circuit. A combination of SEL1 (SEL1B) and SEL3 (SEL3B) determines the number of the delaying inverters 342 in which pulses pass through.

A liquid crystal panel composed of three R, G, and B panels including the synchronizing circuit can correct asymmetric delaying times of pulses from the exterior of the panel. Thus, the liquid crystal panel displays an image without dislocation caused by high regions of R, G, and B pulse phases. A diode for measuring the temperature may be arranged in the panel to correct the delaying time based the output from the diode with reference to a given table.

With reference to FIG. 11 again, a flat counter substrate configuration is described, in which the common electrode substrate 316 has unevenness to prevent reflection at the interface between the common electrode substrate 316 and the transparent common electrode 315 provided thereon. A method for forming the unevenness is sandblasting using fine abrasive grains. The unevenness enhances the contrast of the liquid crystal panel.

A polymer network liquid crystal (PNLC) is used as the liquid crystal material. A polymer dispersion liquid crystal (PDLC) may be used instead of the PNLC. The PNLC is generally prepared by a polymerization-phase separation process. A solution containing a liquid crystal and polymerizable monomers or oligomers is poured into a cell and irradiated with UV to form a polymer network in the liquid crystal. The PNLC contains a large amount of liquid crystal (70 to 90 percent by weight).

In the PNLC, a nematic liquid crystal having a highly anisotropic refractive index ($\Delta n$) shows suppressed light scattering, whereas a nematic liquid crystal having a highly anisotropic dielectric constant ($\Delta \epsilon$) is capable of driving at a low voltage. Regarding the size of the polymer network, when the inter-center distance of the networks is 1 to 1.5 $\mu$m, light scattering is enhanced so that a sufficiently high contrast is achieved.

Figure 15:
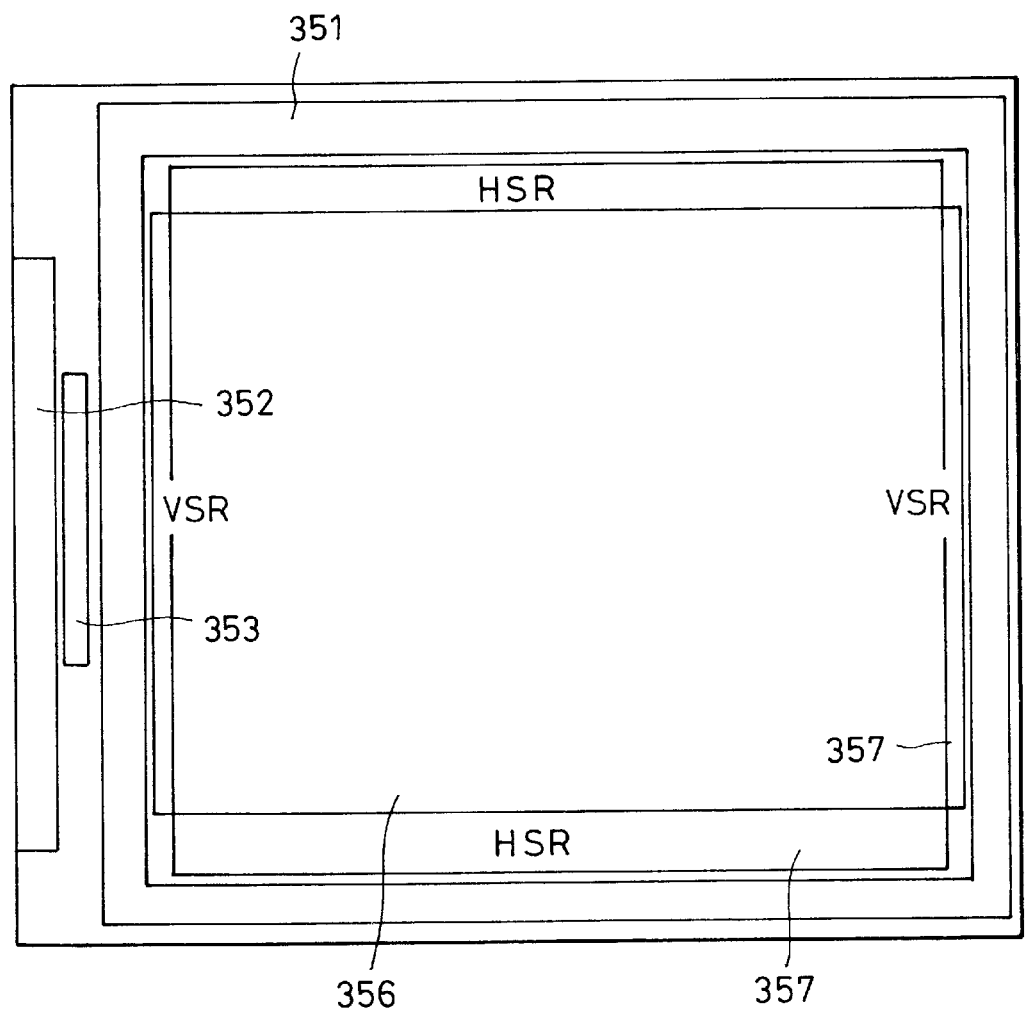
FIG. 15 is a schematic diagram of a liquid crystal panel of a liquid crystal device according to the present invention.

The relationship between the sealing configuration and the panel configuration is described with reference to FIG. 15. In FIG. 15, numeral 351 represents a sealing section, numeral 352 represents an electrode pad, numeral 353 represents a clock buffer circuit, numeral 356 represents a display section of a liquid crystal device, and numeral 357 represents a peripheral circuit section including horizontal and vertical shift registers (HSR and VSR). The sealing section 351 indicates the contact region of an adhesive with a semiconductor substrate 301 having pixel electrodes 312 and with a glass substrate having a common electrode 315. The adhesive at the peripheral region of the display section 356 bonds these substrates to each other. A liquid crystal is encapsulated into the display section 356 and the shift register section 357.

In the present invention, circuits are provided at the interior and exterior of the seal for the purpose of a reduction in total chip size, as shown in FIG. 15. The pad 352 is arranged at one side of the panel in this embodiment. Alternatively, a plurality of pads may be arranged at any side of the panel for a high-speed clock.

The side walls of the panel and the peripheral circuit section in the display region of the panel are composed of shading substrate holders, and the rear surface of the Si substrate is bonded to a high thermal conductivity metal such as copper with an adhesive having high thermal conductivity. Such a configuration prevents a change in the substrate potential of the panel. Thus, the configuration does not cause malfunction of a liquid crystal panel irradiated with high-intensity beams, such as from a projector, since the light beams are effectively blocked at the side walls of the substrate.

Figure 16:
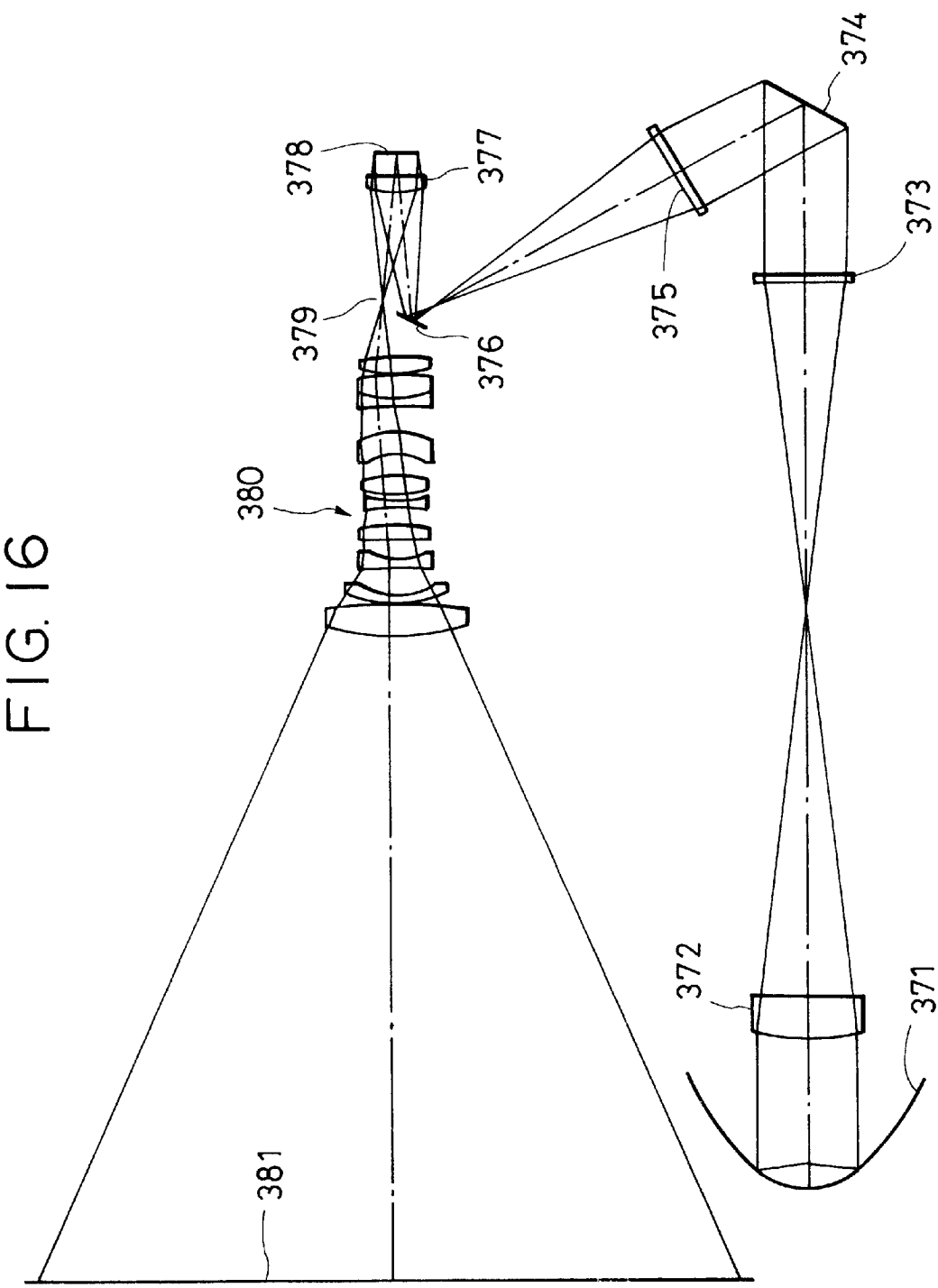
FIG. 16 is a schematic diagram of a liquid crystal projector using a liquid crystal device according to the present invention.

FIG. 16 is a schematic diagram of an optical system including the reflection-type liquid crystal panel in accordance with the present invention. The optical system includes a light source 371, such as a halogen lamp, a collective lens 372, convex Fresnel lenses 373 and 375, and three color separating optical elements 374 (only one element is shown in FIG. 16). The color separating optical elements 374 separate the white light into R, G, and B color beams. Examples of preferable color separating optical elements include a dichroic mirror and a diffraction grating.

The optical system further includes three mirrors 376, three field lenses 377, three R, G, and B reflection liquid crystal devices 378, three diaphragms 379, a projection lens unit 380 and a screen 381 (in FIG. 16, only one optical system from the mirror 376 to the diaphragm 379 corresponding to one color is described). The mirror 376 introduces the R, G and B color beams to three R, G, and B panels. The field lens 377 collimates the light beams from the mirror 376. The collimated light beams are reflected by the R, G , and B reflection liquid crystal devices 378, enlarged by the projection lens unit 380, and projected onto the screen 381. The projection lens unit 380 consists of a plurality of lenses. The screen 381 generally includes a Fresnel lens plate and a lenticular lens plate to display clear, bright images with a high contrast. The Fresnel lens plate converts the projected light into parallel light, and the lenticular lens expands the angle of view in the vertical and horizontal directions. The triple panel configuration may be replaced with a single panel configuration which includes a reflection liquid crystal device and a microlens array provided thereon. The microlens array radiates incident light beams toward any of the R, G, and B pixel regions in response to the colors of the light beams. The light beams are reflected by each pixel when a voltage is applied to the liquid crystal layer of the liquid crystal device. The reflected light beams are projected onto the screen through the diaphragm 379 and the projection lens unit 380.

When no voltage is applied to the liquid crystal layer, the incident light beams are isotropically scattered in the reflection liquid crystal device and do not substantially reach the projection lens unit 380. Thus, a black image is displayed. The optical system has no polarization plate and signal light beams are reflected by the entire surface of the pixel electrode with high reflectance towards the projection lens unit. Thus, the displayed image has a brightness which is two to three times higher than that of conventional systems. Further, the surface and the interface of the counter substrate is provided with an antireflection film. Thus, an image with a high contrast is achieved. The optical system enables a reduction in panel size and thus the size reduction in all the optical units including lenses and mirrors, resulting in cost and weight reduction of the system.

An integrator may be interposed between the light source and the subsequent optical system to remove problems by color unevenness and brightness unevenness of the light source.

A peripheral electrical circuit of the liquid crystal panel will now be described with reference to FIG. 17. An electrical power source 385 includes a lamp power source 385B and a system power source 385A for driving the panel and a signal processing circuit. Electricity is supplied to the electrical power source 385 through a plug 386. A lamp temperature detector 387 detects the lamp temperature and submits the signals to a control board 388. The control board 388 turns the lamp switch off when the lamp temperature rises abnormally. The control board 388 also controls a filter safety switch 389. The filter safety switch 389 has the following function. When the lamp housing is at a high temperature, the lamp housing is locked. In this embodiment, the circuit includes a speaker 390 and a voice board 391. The circuit may further include a 3D sound processor or a surround sound processor, if necessary. A first extended board 392 includes an S terminal for video signals, an input terminal from an external unit 396 for receiving composite images for video signals and voices, a selection switch 395 for selecting the signals, and a tuner 394. The first extended board 392 submits signals to a second extended board 400 through a decoder 393. The second extended board 400 receives signals from videos or computers through a D-sub fifteen pin terminal and a switch 450 and converts the signals into digital signals through an A/D converter 451. The switch 450 selects the signals from the decoder 393 or the D-sub fifteen pin terminal.

A main board 453 includes memories such as video RAMs and a CPU. The main board 453 stores digital NTSC signals from the AD converter 451, completes the signals such that the number of the signals agrees with the number of the pixels in the liquid crystal display device, and processes various signals, such as γ-conversion edge gradation suitable for the liquid crystal display device and biasing for brightness control. The main board 453 also converts resolution of VGA signals into that for a high resolution XGA panel. Further, the main board 453 combines NTSC signals for a plurality of images with computer signals. The output from the main board 453 is serial/parallel-converted into a form less affected by noise and submitted to a head board 454. The head board 454 serial/parallel-reconverts and D/A-converts the output, and divides the output according to the number of the video lines in the panel. The divided signals are submitted to three R, G and B liquid crystal panels 455, 456, and 457 through a drive amplifier. The screen is controlled through a remote controller panel 452. The R, G, and B liquid crystal panels 455, 456, and 457 have their corresponding color filters and are driven by a general horizontal/vertical scanning means. An image not having high resolution can be converted into a high-resolution image in the liquid crystal display device, as described above.

In the seventh embodiment, individual segmental technologies described regarding various types of liquid crystal panels can be used in any combination. Liquid crystal panel configurations using a general transparent substrate other than the above-described semiconductor substrate are also effective in this embodiment. The technologies in this embodiment are also applicable to a transparent-type liquid crystal display device. The liquid crystal panel may be a diode-type in place of the MOSFET and TFT type in this embodiment. The liquid crystal panel in this embodiment can be used in display devices for home televisions, projectors, headmounted displays, 3D image game machines, laptop computers, electronic notebooks, TV conference systems, car navigation systems, and airplane panels.

Seventh Embodiment

Figure 18A:
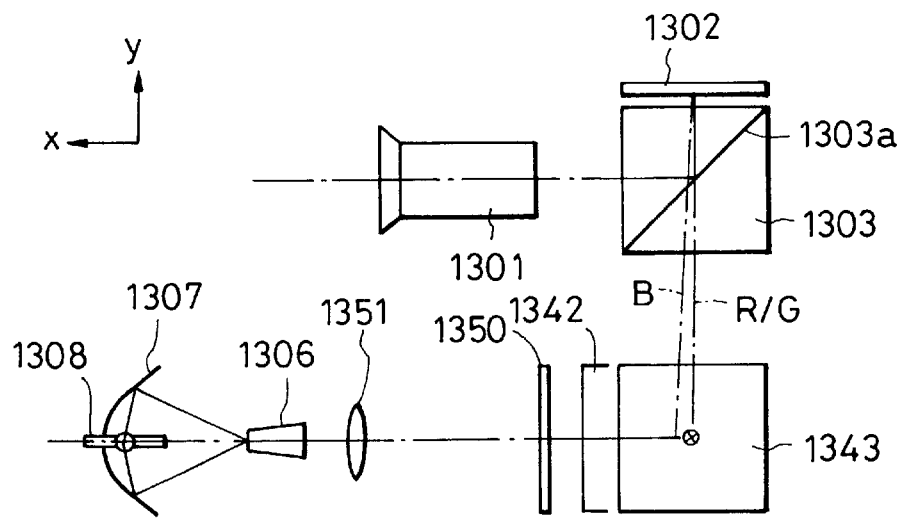
FIGS. 18A to 18C are schematic diagrams of an optical system of a projection-type liquid crystal display device according to the present invention.
Figure 18B:
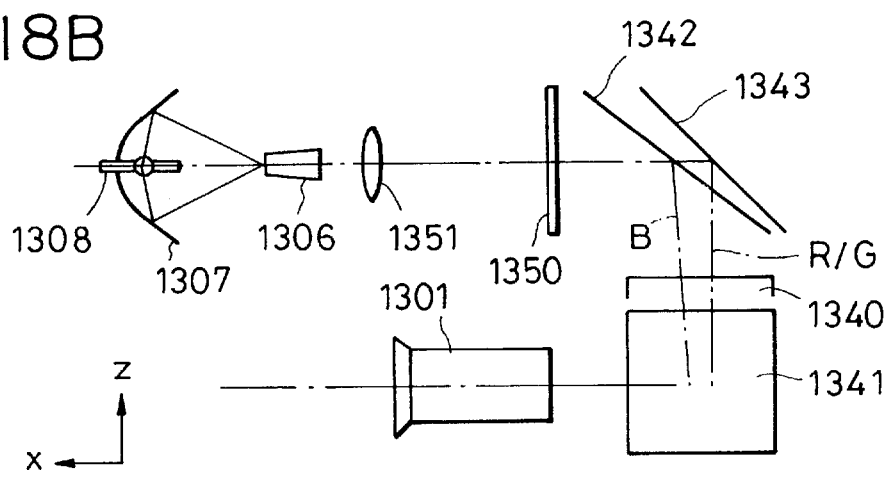
Figure 18C:
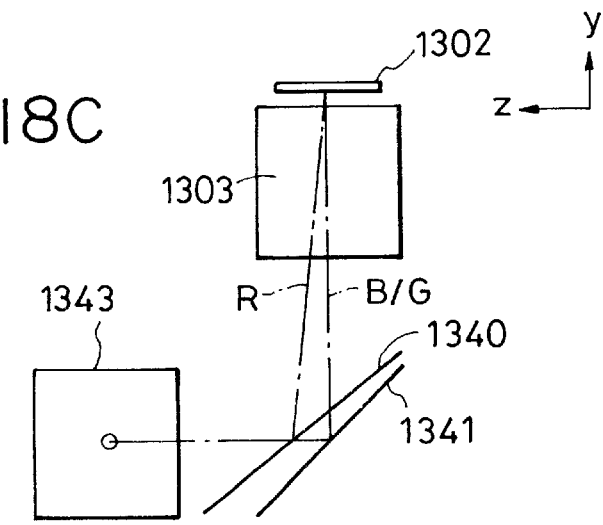
Figure 19A:
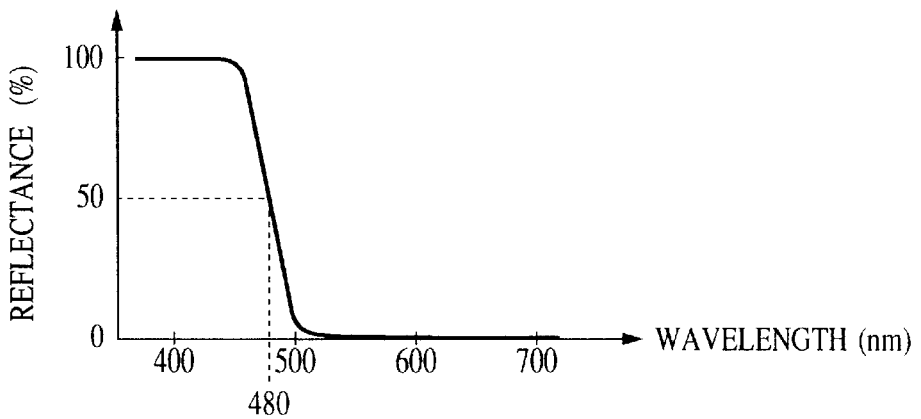
FIGS. 19A to 19C are graphs of spectral reflectance characteristics of dichroic mirrors used in an optical system of a projection-type liquid crystal display device according to the present invention.
Figure 19B:
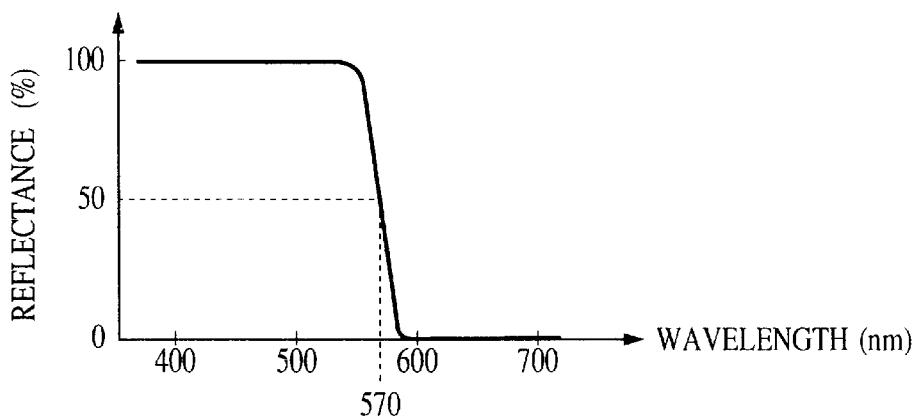
Figure 19C:
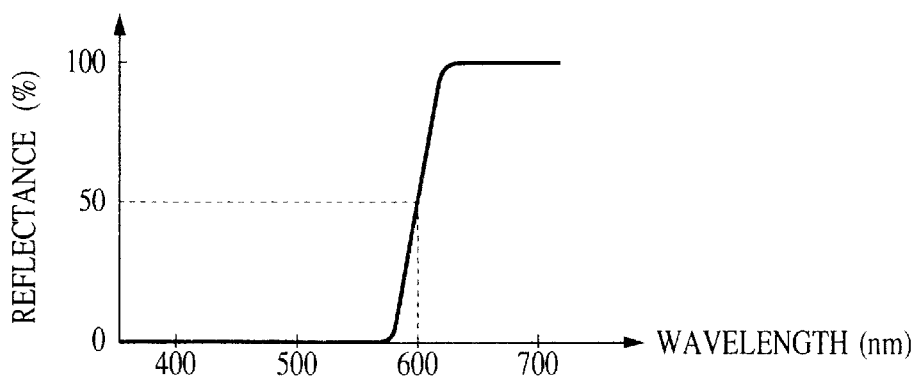
Figure 20:
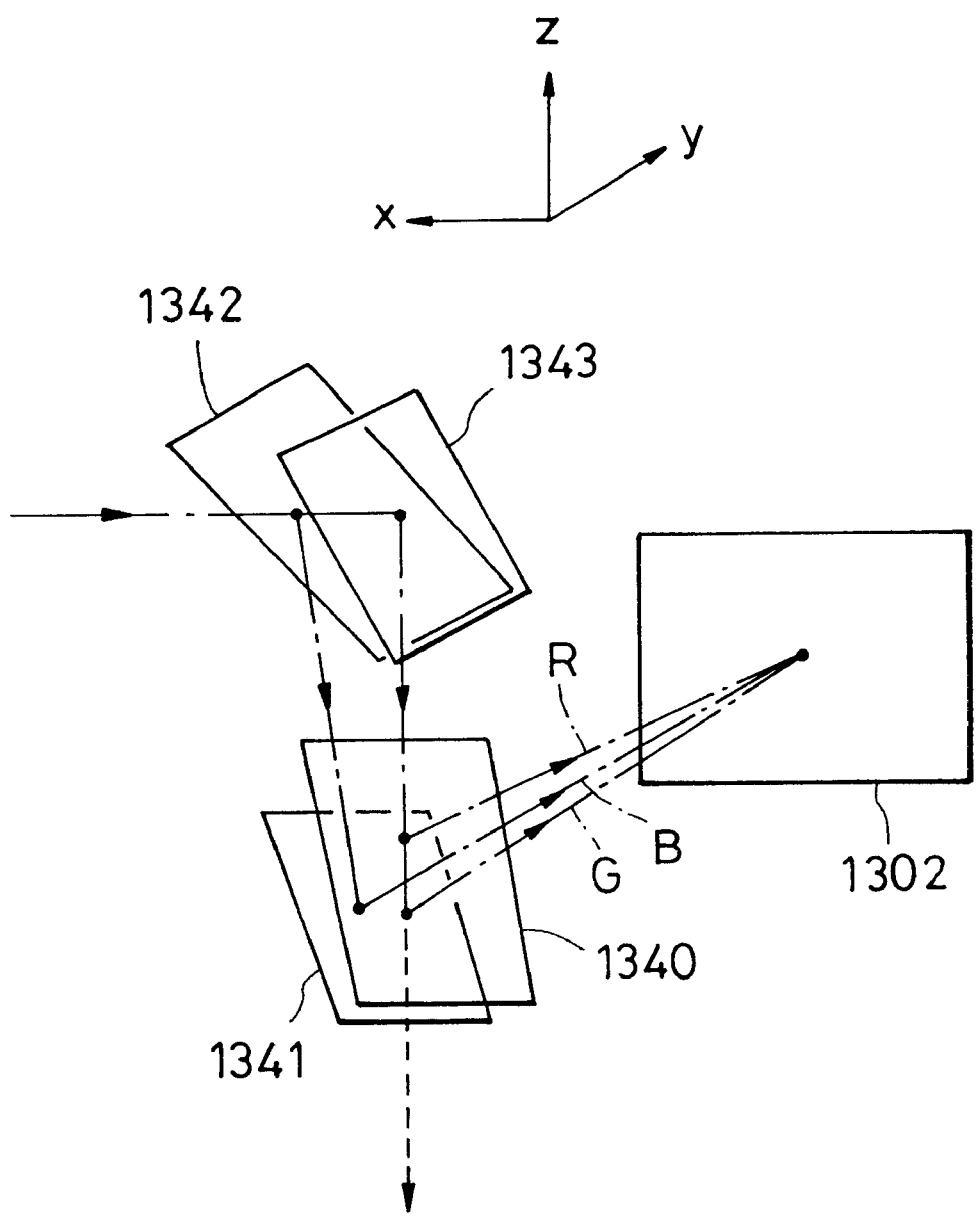
FIG. 20 is an isometric view of a color-separation/illumination section in an optical system of a projection-type liquid crystal display device according to the present invention.

FIGS. 18A to 18C are block diagrams of an optical system for a front/rear projection-type liquid crystal display device in accordance with the present invention. FIGS. 18A, 18B, and 18C are a top view, a front view, and a side view of the optical system. The optical system includes a projection lens 1301 for projecting images on a screen, a liquid crystal panel 1302 provided with a microlens, a polarizing beam splitter (PBS) 1303, an R reflecting dichroic mirror 1340, a B/G reflecting dichroic mirror 1341, a B reflecting dichroic mirror 1342, a high reflectance mirror 1343 for entirely reflecting the color light beams, a Fresnel lens 1350, a convex lens 1351, a rod integrator 1306, an oval reflector 1307, and an arc lamp 1308 such as a metal halide lamp or a UHP lamp. The R reflecting dichroic mirror 1340, the B/G reflecting dichroic mirror 1341 and the B reflecting dichroic mirror 1342 have spectral reflectance characteristics as shown in FIGS. 19A to 19C, respectively. These dichroic mirrors 1340, 1341, and 1342 and the high reflectance mirror 1343 are arranged as shown in an isometric view of FIG. 20. These mirrors decompose white light beams into R, G, and B color beams and the liquid crystal panel 1302 is illuminated with the R, G, and B color beams from different directions.

With reference to FIGS. 18A to 18C, the arc lamp 1308 as a light source emits white light beams, which are collected to the port of the integrator 1306. The light beams pass through while repeating reflection the interior of the integrator 1306. The spatial distribution of the intensity of the light beams becomes uniform in the integrator 1306. The light beams from the integrator 1306 collimated in the X direction (based on the front view of FIG. 18B) by the convex lens 1351 and the Fresnel lens 1350 towards the B reflecting dichroic mirror 1342. The B reflecting dichroic mirror 1342 reflects blue light beams in the Z direction with a given angle towards the R reflecting dichroic mirror 1340, whereas the B reflecting dichroic mirror 1342 transmits R/G light beams. The R/G light beams are reflected in the Z direction by the high reflectance mirror 1343 towards the R reflecting dichroic mirror 1340. The B reflecting dichroic mirror 1342 and the high reflectance dichroic mirror 1343 are arranged so as to reflect downwardly in the Z direction (based on the front view of FIG. 18A) the light beams (along the X direction) from the integrator 1306. Thus, the high reflectance mirror 1343 has a tilt of 45° to the XY plane with a Y rotation axis. The B reflecting dichroic mirror 1342 has a tilt of less than 45° to the XY plane with a Y rotation axis. As a result, the R/G light beams are reflected by 90° in the Z direction by the high reflectance mirror 1343, whereas the B light beams are downwardly reflected in the Z direction with a given angle (tilted in the XZ plane). The shift distance and tilt angle between the high reflectance mirror 1343 and the B reflecting dichroic mirror 1342 are determined so that main light beams of three primary colors cross on the liquid crystal panel 1302. The B light beams and the R/G light beams thereby illuminate the same range on the liquid crystal panel 1302.

The R/G/B light beams in the Z direction travel towards the R reflecting dichroic mirror 1340 and the B/G reflecting dichroic mirror 1341. The R reflecting dichroic mirror 1340 and the B/G reflecting dichroic mirror 1341 lie under the B reflecting dichroic mirror 1342 and the high reflectance mirror 1343. The B/G reflecting mirror 1341 has a tilt of 45° to the XZ plane with an X rotation axis. The R reflecting dichroic mirror 1340 has a tilt of less than 45° to the XZ plane with a Z rotation axis. Thus, B/G light beams pass through the R reflecting dichroic mirror 1340, are reflected by 90° in the Y+ direction by the B/G reflecting dichroic mirror 1341, are polarized by the PBS 1303, and are incident on the liquid crystal panel 1302 which is horizontally arranged on the XZ plane. The B light beams having a given angle to the X axis (tilted in the XZ plane) are reflected by the R/G reflecting dichroic mirror 1341 while maintaining the tilt angle to the Y axis (tilted in the XY plane), and are incident on the liquid crystal panel 1302 with an incident angle (in the direction of the XY plane) corresponding to the tilt angle.

The G light beams are reflected by 90° in the Y+ direction by the B/G reflecting dichroic mirror 1341, polarized by the PBS 1303 and incident on the liquid crystal panel 1302 with an incident angle of 0° or in the vertical direction. The R light beams are reflected in the Y+ direction by the R reflecting dichroic mirror 1340, which is arranged in front of the B/G reflecting dichroic mirror 1341, so that the beams have a given angle (tilted in the YZ plane) as shown in FIG. 18C. The R light beams are then polarized by the PBS 1303 and incident on the liquid crystal panel 1302 with an incident angle (in the YZ direction) corresponding to the tilt angle. The shift distance and tilt angle between the B/G reflecting dichroic mirror 1341 and the B reflecting dichroic mirror 1342 are determined so that the main light beams of the three primary colors intersect at the liquid crystal panel 1302. The R, G, and B light beams thereby illuminate the same range on the liquid crystal panel 1302. With reference to FIGS. 19A to 19C, the B reflecting dichroic mirror 1342, the B/G reflecting dichroic mirror 1341 and the R reflecting dichroic mirror 1340 have a cut-off wavelength of 480 nm, 570 nm, and 600 nm, respectively. Thus, the B/G reflecting dichroic mirror 1341 transmits unnecessary orange light beams. The color balance can thereby be optimized.

Figure 26:
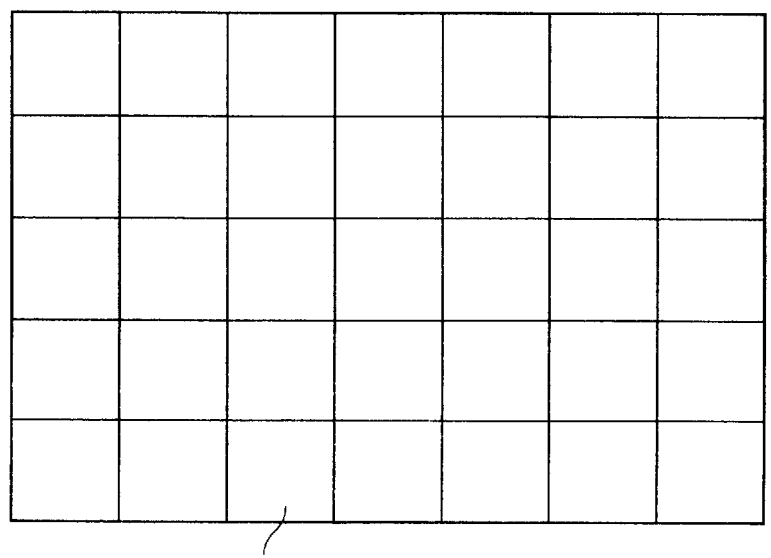
FIG. 26 is a partially enlarged view of an image projected on a screen in a projection-type liquid crystal display device according to the present invention.
Figures 30, 31:
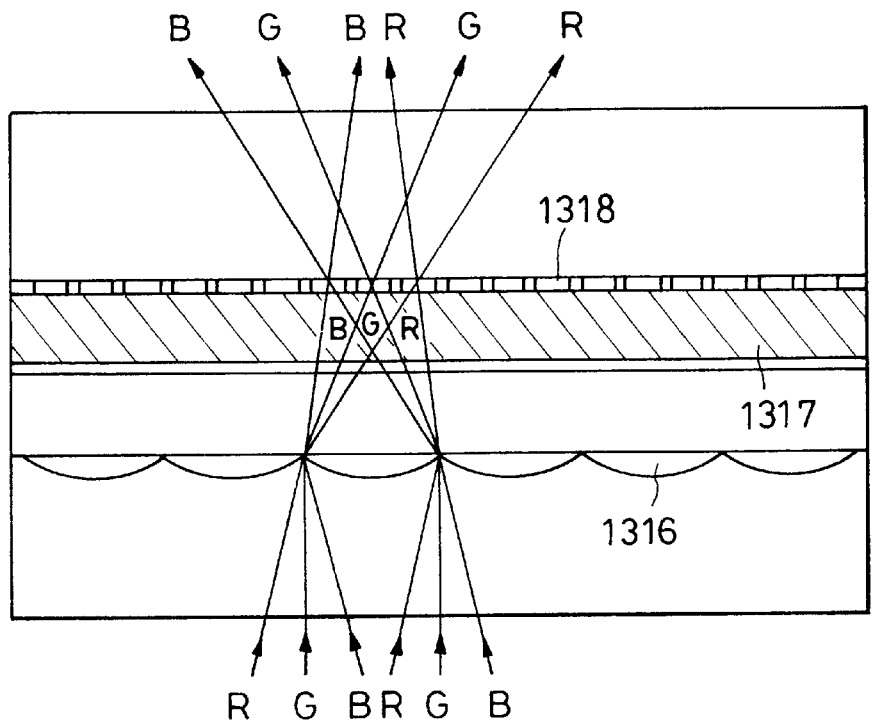
FIG. 30 is a cross-sectional schematic view illustrating the direction of the light beams in a liquid crystal panel of a liquid crystal device.
FIG. 31 a schematic diagram of a pixel configuration of a color liquid crystal panel of a liquid crystal device.
Figure 32A:
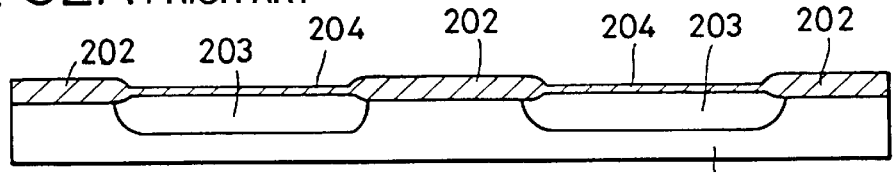
FIGS. 32A to 32H are cross-sectional views of production steps of a liquid crystal panel of a liquid crystal device.
Figure 32B:
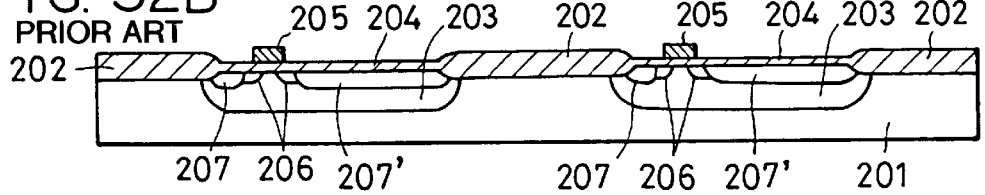
Figure 32C:
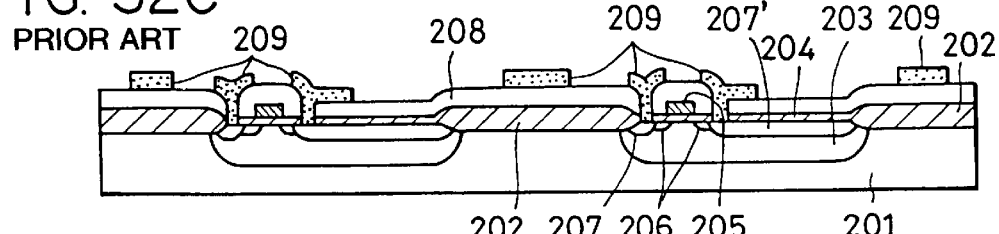
Figure 32D:
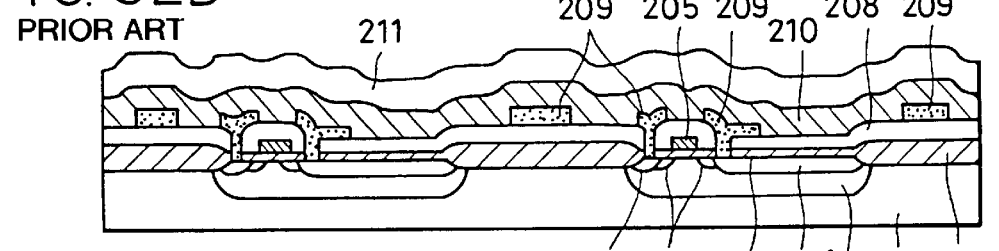
Figure 32E:
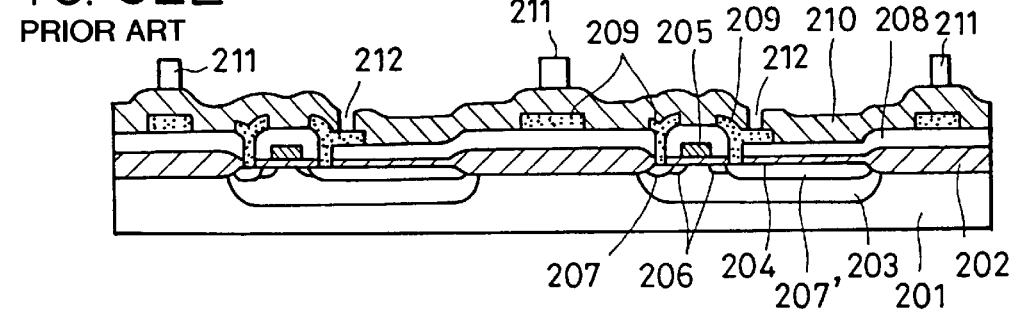
Figure 32F:
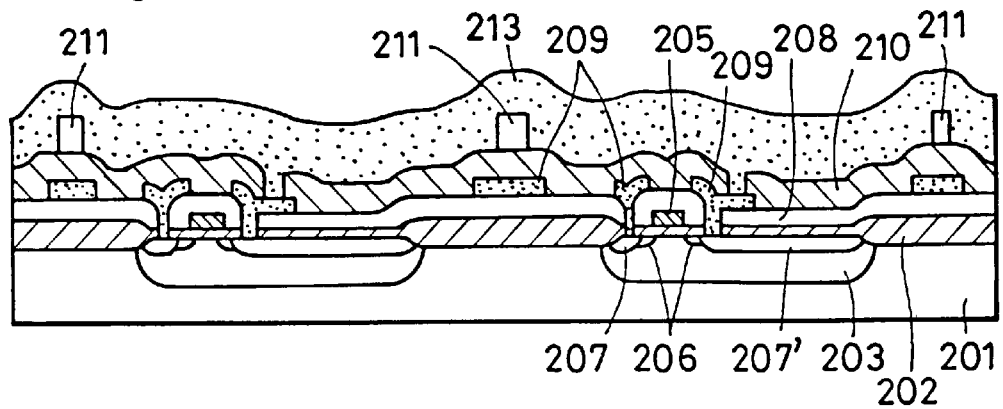
Figure 32G:
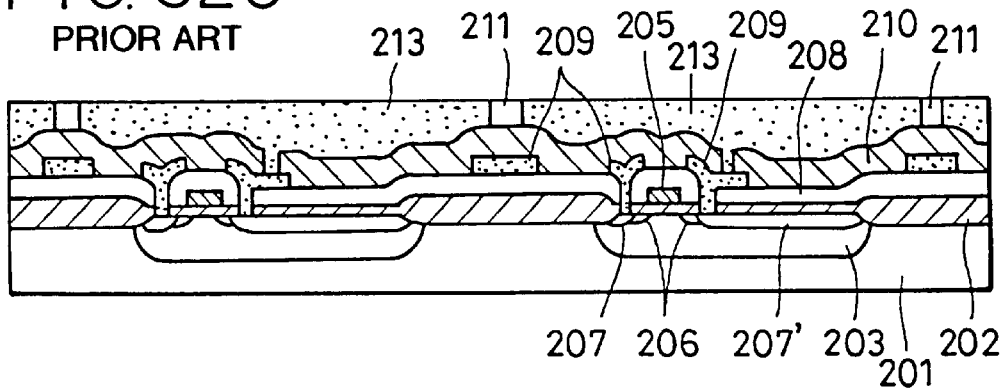
Figure 32H:
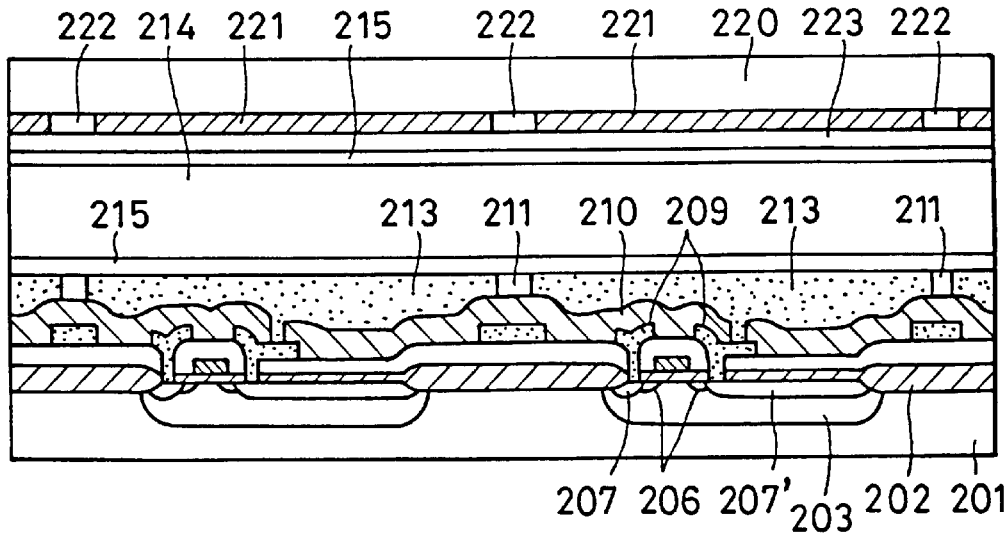

As described later, the R, G, and B light beams are reflected and polarized by the liquid crystal panel 1302, and incident on the PBS 1303. Light beams which are reflected in the X+ direction by the PBS face 1303a in the PBS 1303 are enlarged by the projection lens 1301 and projected onto the screen (not shown in the drawings) as an image. The R, G, and B light beams enter the liquid crystal panel 1302 with different incident angles, and thus are emitted from the liquid crystal panel 1302 at different angles. Thus, the projection lens 1301 used has a large diameter and a large aperture. The divergence of light beams from the liquid crystal panel 1302 is relatively low in this embodiment, because the light beams are collimated by passing twice through the microlens. Thus, a bright image is projected through an inexpensive projection lens with a lower aperture. In contrast, the divergence of light beams in conventional transmittance-type liquid crystal panels is large because of collimating effects by the microlens, as shown in FIG. 26. Thus, an expensive projection lens with a large aperture must be used. In the invention, a stripe-type display system as shown in FIG. 31 can be used; however, this system is not desirable for a liquid crystal panel employing microlens elements, as described below.

Figure 21:
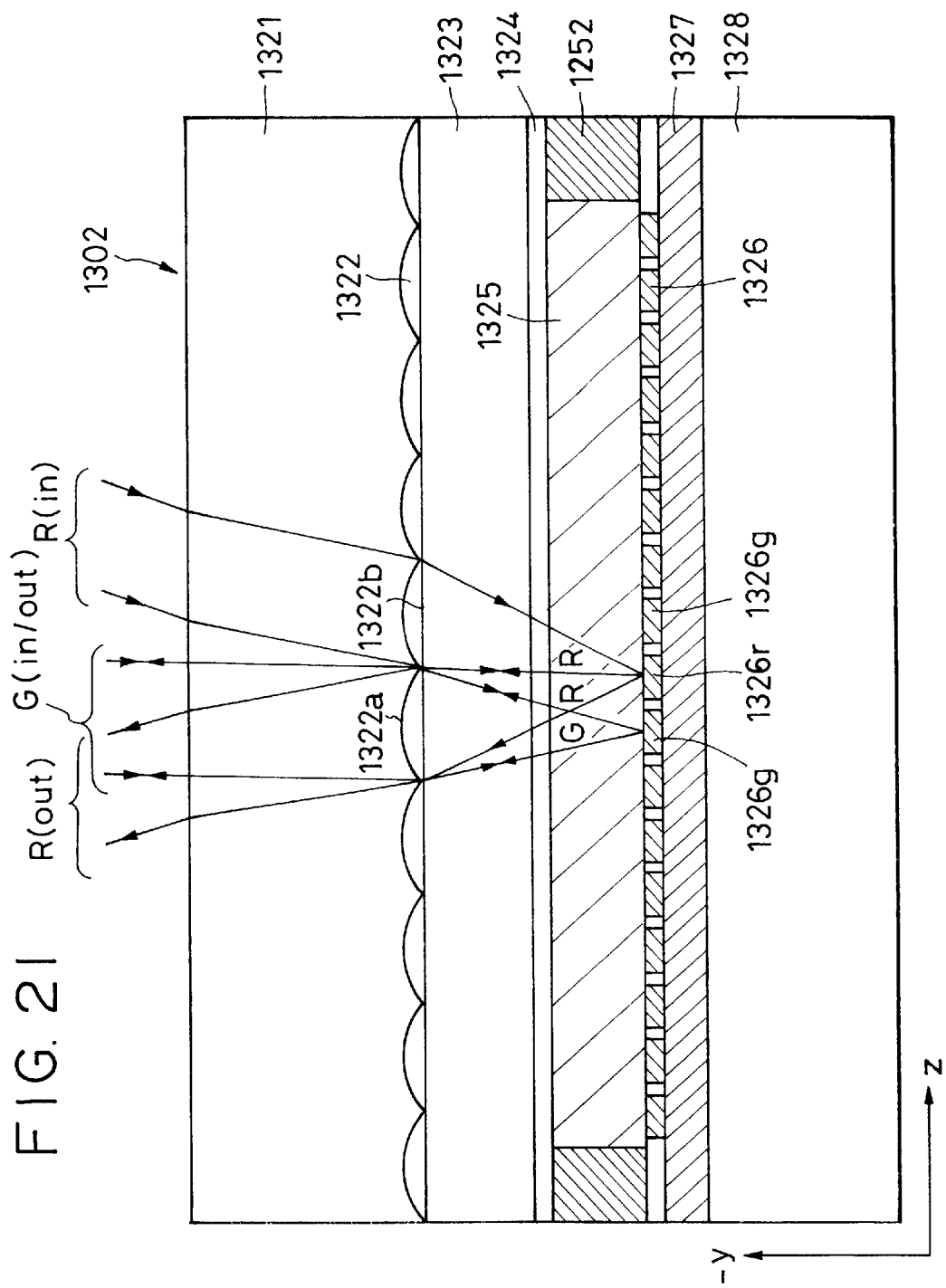
FIG. 21 is a cross-sectional view of an embodiment of a liquid crystal panel according to the present invention.

The liquid crystal panel 1302 in this embodiment will now be described with reference to an enlarged cross-sectional view in FIG. 21. The cross-section corresponds to the YZ plane in FIG. 20. In FIG. 21, numeral 1321 represents a microlens substrate, numeral 1322 represents a microlens, numeral 1323 represents a glass sheet, numeral 1324 represents a transparent counter electrode, numeral 1325 represents a liquid crystal layer, numeral 1326 represents a pixel electrode, numeral 1327 represents an active matrix driving circuit section, numeral 1328 represents a silicon semiconductor substrate, and numeral 1252 represents a boundary section. In this embodiment, all the R, G, and B pixels are integrated in one panel, and thus each pixel is small. As a result, a larger aperture ratio has a great significance, as described in the first to fifth embodiments. The microlens 1322 is formed on the glass substrate 1321 composed of alkaline glass by an ion-exchange process, and has an orthogonal array structure with a pitch which is two times that of the pixel electrode 1326.

The liquid crystal layer 1325 contains an ECB-type nematic liquid crystal, such as DAP or HAN, which is suitable for a reflection-type liquid crystal display device. The liquid crystal is aligned by an alignment layer (not shown in the drawing). Since the voltage in this embodiment is lower than that in the sixth embodiment, the potential to be applied to the pixel electrode 1326 must have high accuracy. The pixel electrode 1326 is composed of aluminum, and functions as a reflecting mirror. Thus, it is subjected to CMP treatment in the finishing step after patterning to polish the surface and to improve the reflectance.

The active matrix driving circuit section 1327 is a semiconductor circuit provided on the silicon semiconductor substrate 1328, and drives the pixel electrode 1326 by an active matrix mode. A gate line driver including a vertical register and a signal line driver including a horizontal register, not shown in the drawing, are provided at the peripheral section of the circuit matrix. RGB primary color signals are transmitted to corresponding RGB pixels by the peripheral driving and active matrix driving circuits. Each pixel electrode 1326 in the RGB pixel array does not have a color filter and is discriminated as one of the RGB pixels by the primary color image signal from the active matrix driving circuit.

For example, G light beams are polarized by the PBS 1303 and incident on the liquid crystal panel 1302 in the vertical direction. Among the G light beams, beams which are incident on a microlens 1322a are indicated by arrows G(in/out) in FIG. 21. The G light beams are collected by the microlens 1322 to illuminate the G pixel electrode 1326g, and reflected by the G pixel electrode 1326g and emitted to the exterior of the panel through the microlens 1322a. When the G light beams reciprocally pass through the liquid crystal layer 1325, they are modulated by the operation of the liquid crystal which is caused by an electric field formed by a signal voltage applied to the pixel electrode 1326a. The G light beams from the liquid crystal layer are incident on the PBS 1303.

The G light beams are reflected by the PBS face 1303a (in FIG. 18A) in response to the extent of modulation. Thus, the quantity of light, which is incident on the projection lens, varies with the extent of modulation. Each pixel can display gradations in such a manner. The R light beams, incident on the liquid crystal panel in the diagonal direction of the YZ cross-section, are polarized by the PBS 1303 (in FIG. 18C). For example, the R light beams incident on the microlens 1322*b* are referred to as arrows R(in). The R light beams are collected by the microlens 1322*b* to illuminate an R pixel electrode 1326*r*, which is located at the left side from the microlens 1322*b*. The R light beams (R(out)) are reflected by the pixel electrode 1326*r* and emitted to the exterior of the panel through a microlens 1322*a* lying at the left side (−Z direction) of the microlens 1322*b*.

The R polarized light beams are modulated in the liquid crystal layer by the operation of the liquid crystal in response to the image signal which is applied to the pixel electrode 1326*r*. The emitted R light beams pass through the PBS 1303, and are projected through the projection lens 1301 by the same process as that in the G light beams. In FIG. 21, the drawing is shown as if the G light beams and the R light beams partly overlap with and interfere each other on the pixel electrodes 1326*g* and 1326*r*, because the thickness of the liquid crystal layer in FIG. 21 is enlarged. In general, the liquid crystal layer has a thickness of 1 to 5 $\mu$m, which is significantly less than the thickness of the glass sheet 1323, that is, 50 to 100 $\mu$m. Thus, such interference will not occur in the practical liquid crystal panel regardless of the pixel size.

Figure 22A:
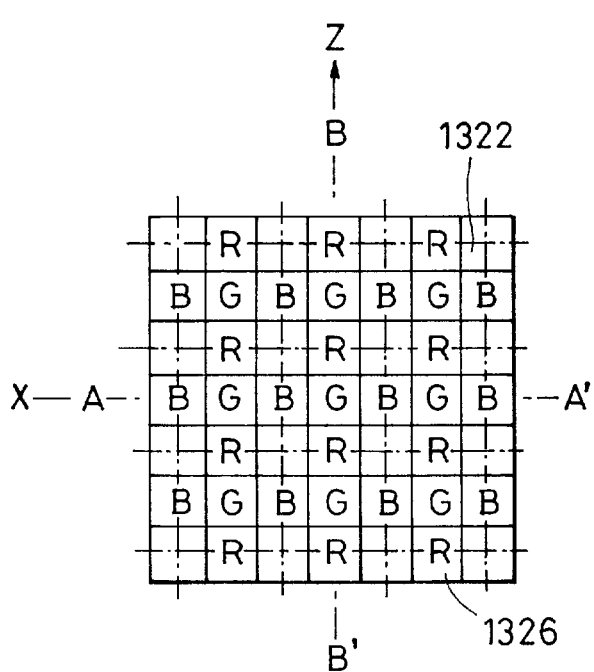
FIGS. 22A to 22C are schematic views illustrating the principle of color separation and color recombination in a liquid crystal panel according to the present invention.
Figure 22C:
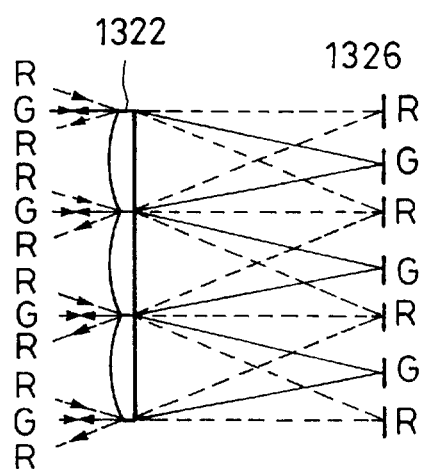
Figure 22B:
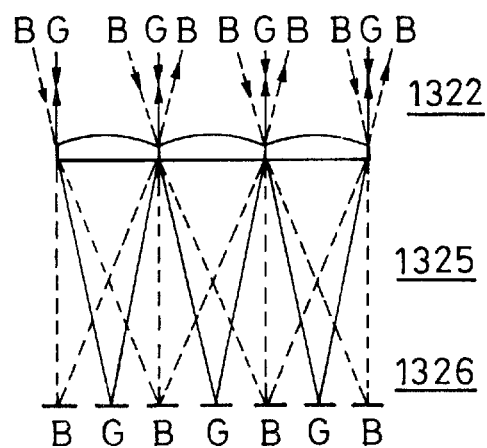

The color decomposition and recombination in this embodiment will now be described with reference to FIGS. 22A to 22C. FIGS. 22A, 22B, and 22C are a top view, an A—A' cross-sectional view (in the X direction) of the top view, and a B—B' cross-sectional view (in the Y direction) of the top view, respectively, of a schematic diagram of the liquid crystal panel 1302. Chain lines in FIG. 22A indicate boundaries of the microlens 1322. A region surrounded with the chain lines includes a central G pixel, halves of two adjacent R pixels and halves of two adjacent B pixels. FIG. 22C corresponds to FIG. 21 and shows R and G light beams which are incident on and emitted from the microlens 1322. As shown in the drawings, each G pixel electrode is arranged just under the center of a microlens element, whereas each R pixel electrode is arranged just under the boundary between two adjacent microlens elements. It is preferable that the incident angle ($\theta$) of the R light beams be set such that tan $\theta$ is equal to the ratio of the pixel pitch (including a B pixel electrode and an R pixel electrode) to the distance between the microlens and the pixel electrode. FIG. 22B corresponds to the XY cross-section of the liquid crystal panel 1302. In the XY cross-section, B pixel electrodes and G pixel electrodes are alternately arranged. Each G pixel electrode is arranged just under the center of a microlens element, whereas each B pixel electrode is arranged just under the boundary between two adjacent microlens elements.

The B light beams, which are polarized by the PBS 1303, are incident on the liquid crystal panel in the diagonal direction of the XY cross-section in FIG. 18A. The B light beams from a microlens element are reflected by a B pixel electrode 1326B and emmited from the next microlens element in the X direction. The B light beams are also modulated by the liquid crystal and projected through the projection lens, as in the G and R light beams.

Each B pixel electrode is arranged just under the boundary between two adjacent microlens elements. It is preferable that the incident angle ($\theta$) of the B light beams be set such that tan $\theta$ is equal to the ratio of the pixel pitch (including a B pixel electrode and a G pixel electrode) to the distance between the microlens and the pixel electrode. The liquid crystal panel in this embodiment has an RGB pixel array as shown in FIG. 22A, that is, arrangement RGRGRG . . . in the Z direction and arrangement BGBGBG . . . in the X direction. The size of each pixel is half the size of each microlens element, and thus the pitch between pixels is half that between microlens elements. FIG. 22A also shows that each G pixel lies just under the center of a microlens element, each R pixel lies just under a boundary of two adjacent microlens elements in the Z direction, and each B pixel lies just under a boundary of two adjacent microlens elements in the X direction. Each microlens element has a square shape in plan view and an area which is two times that of a pixel.

Figure 23:
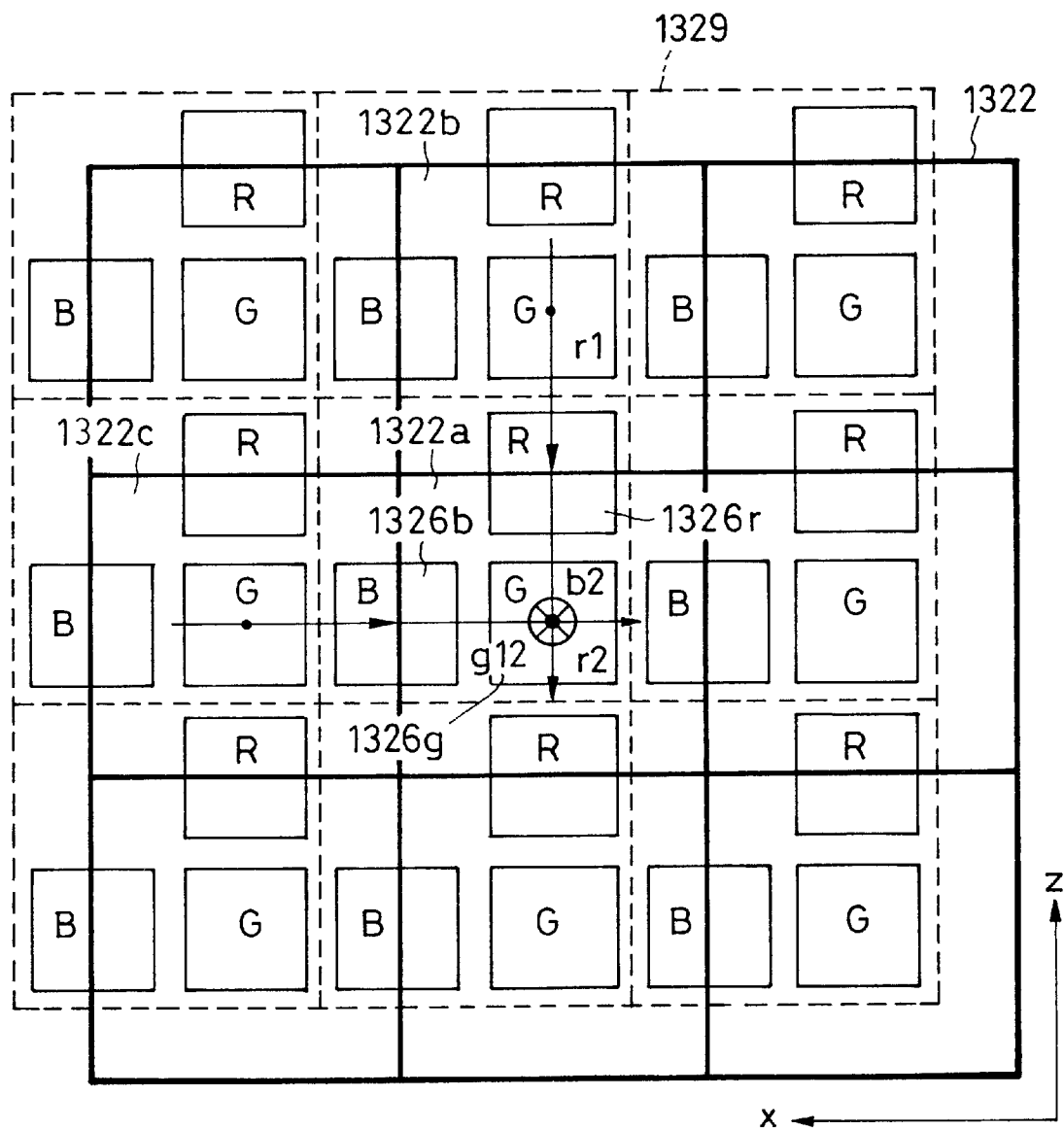
FIG. 23 is an enlarged top view of a liquid crystal panel of an embodiment according to the present invention.

FIG. 23 is an enlarged partial plan view of the liquid crystal panel, in which each grid 1329 surrounded with broken lines indicates an RGB pixel unit. The RGB pixels in the RGB pixel unit 1329 are driven in response to the corresponding RGB image signals from the active matrix driving circuit section 1327. With reference to an RGB pixel unit including an R pixel electrode 1326*r*, a G pixel electrode 1326*g* and a B pixel electrode 1326*b*, R light beams from the microlens element 1322*b* are diagonally incident on the R pixel electrode 1326*r* as shown by the arrow r1, and the reflected light beams are emitted through the microlens element 1332*a* as shown by the arrow r2. B light beams from the microlens element 1322*c* are diagonally incident on the B pixel electrode 1326*b* as shown by the arrow b1, and the reflected light beams are emitted through the microlens element 1332*a* as shown by the arrow b2. Further, G light beams from the microlens element 1322*a* are vertically incident on the G pixel electrode 1326*g* as shown by the arrow g12, and the reflected light beams are emitted through the microlens element 1332*a* as shown by the arrow g12.

As described above, the RGB light beams are incident on an RGB pixel unit through different microlens elements 1322*a*, 1322*b*, and 1322*c* and are emitted through the same microlens element 1322*a*. Such a relationship holds for all RGB pixel units.

Figure 24:
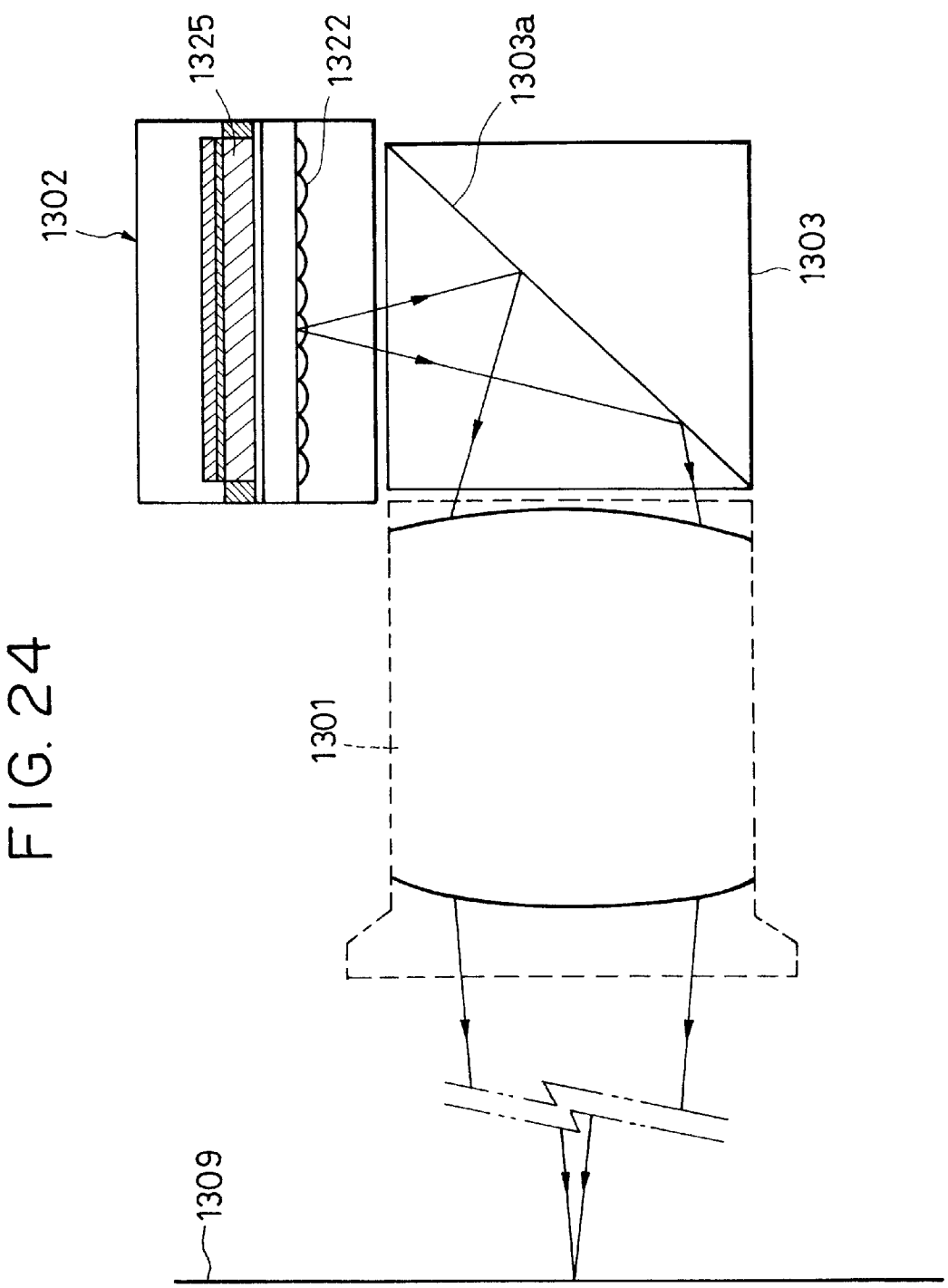
FIG. 24 is a partial block diagram of a projection optical system in a projection-type liquid crystal display device according to the present invention.

With reference to FIG. 24, the entire emitted light beams are projected onto the screen 1309 through the PBS 1303 and the projection lens 1301. The optical system is aligned such that an image at the position of the microlens of the liquid crystal panel 1302 is formed on the projection lens 1301. Thus, the projected image consists of recombined color units, and each recombined color unit consists of RGB light beams from the same RGB pixel unit, as shown in FIG. 30. The resulting color image does not have an RGB mosaic pattern as shown in FIG. 31, and thus has high quality.

In the cross-sectional view of FIG. 21, the active matrix driving circuit section 1327 lies under the pixel electrodes and RGB pixels are depicted in a row. The drain of each pixel FET is connected to each of RGB pixel electrodes 1326 arranged as shown in FIG. 23.

Figure 25:
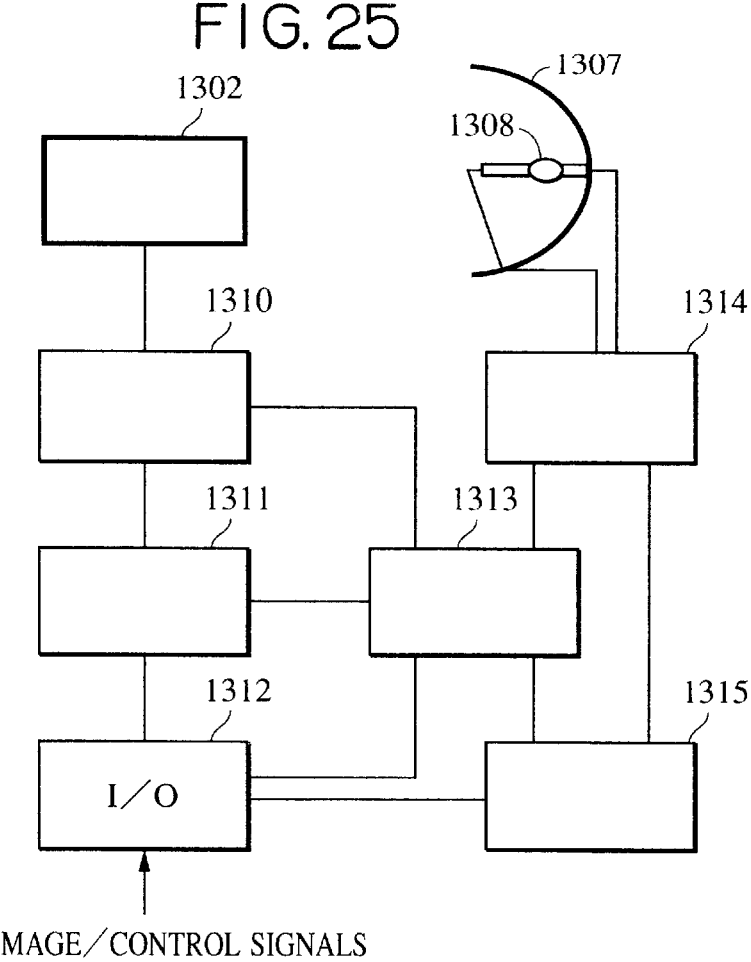
FIG. 25 is a block diagram of a driving circuit system in a projection-type liquid crystal display device according to the present invention.

FIG. 25 is a block diagram of a driving circuit of the projection-type liquid crystal display device. A panel driver 1310 inverts the polarity of RGB image signals, and forms amplified liquid crystal driving signals, driving signals for the counter electrode 1324 and various timing signals. An interface 1312 decodes various image signals and control signals to form standard image signals. A decoder 1311 converts the standard image signals from the interface 1312 into RGB primary color image signals and synchronizing signals, that is, image signals for the liquid crystal panel 1302. A ballast 1314 drives an arc lamp 1308 in a parabolic reflector 1307. An electrical power supply circuit 1315 supplies electricity to each circuit block. A controller 1313 includes an operational section not shown in the drawing and systematically controls each circuit block. As described above, the projection-type liquid crystal display device has a driving circuit system which is generally used in single-plate projectors. Thus, the device can display images free of mosaic patternning without pixalatin a heavy load on the driving circuit system.

Figure 27:
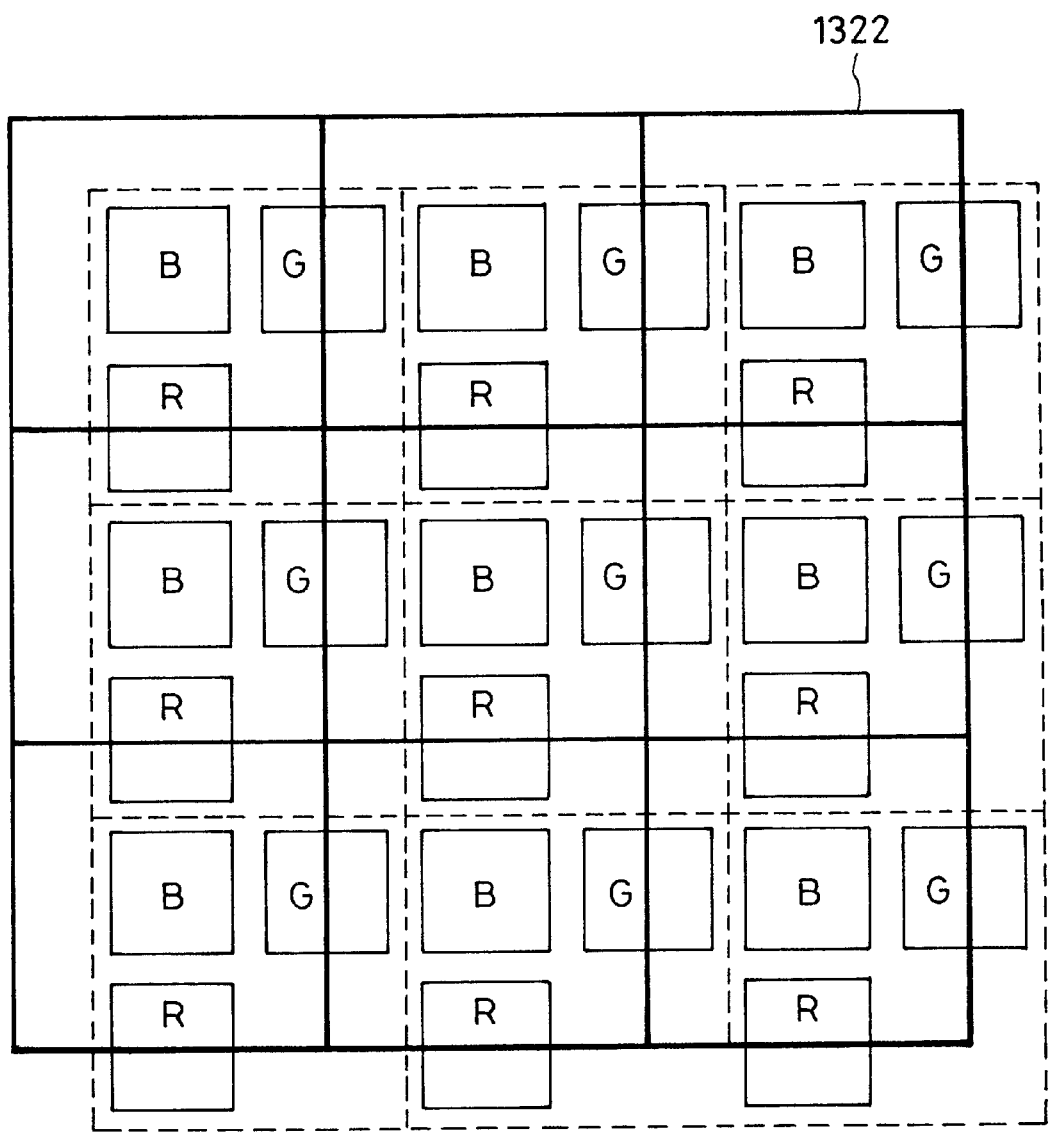
FIG. 27 is a partially enlarged top view of a liquid crystal panel of an embodiment according to the present invention.

FIG. 27 is an enlarged partial cross-sectional view of another embodiment of the liquid crystal panel. A microlens element is provided for three pixel electrodes. Each B pixel electrode is arranged just under the center of each microlens element 1322; B pixels and G pixels are alternately arranged in the horizontal direction, and B pixels and R pixels are alternately arranged in the vertical direction. When vertical B light beams, and diagonal R/G light beams are incident on the corresponding RGB pixels as described above, the reflected light beams are emitted through the same microlens element. Alternatively, each R pixel may be arranged just under the center of each microlens element 1322, and G and B pixels may be arranged such that G and B pixels are alternately arranged in terms of R pixels in the horizontal and vertical directions.

Eighth Embodiment

Figure 28:
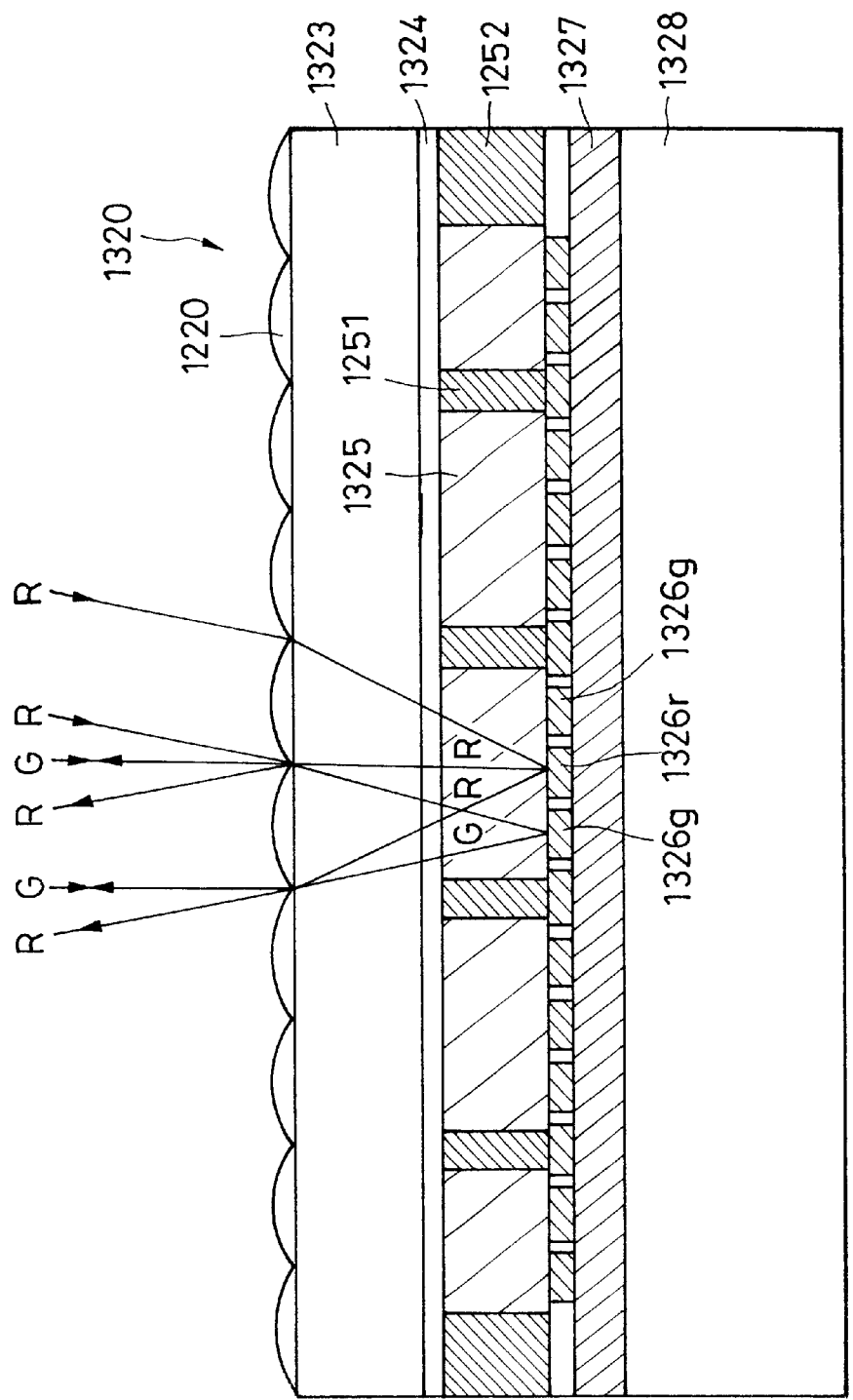
FIG. 28 is a partially enlarged cross-sectional view of a liquid crystal panel of an embodiment according to the present invention.
Figure 29A:
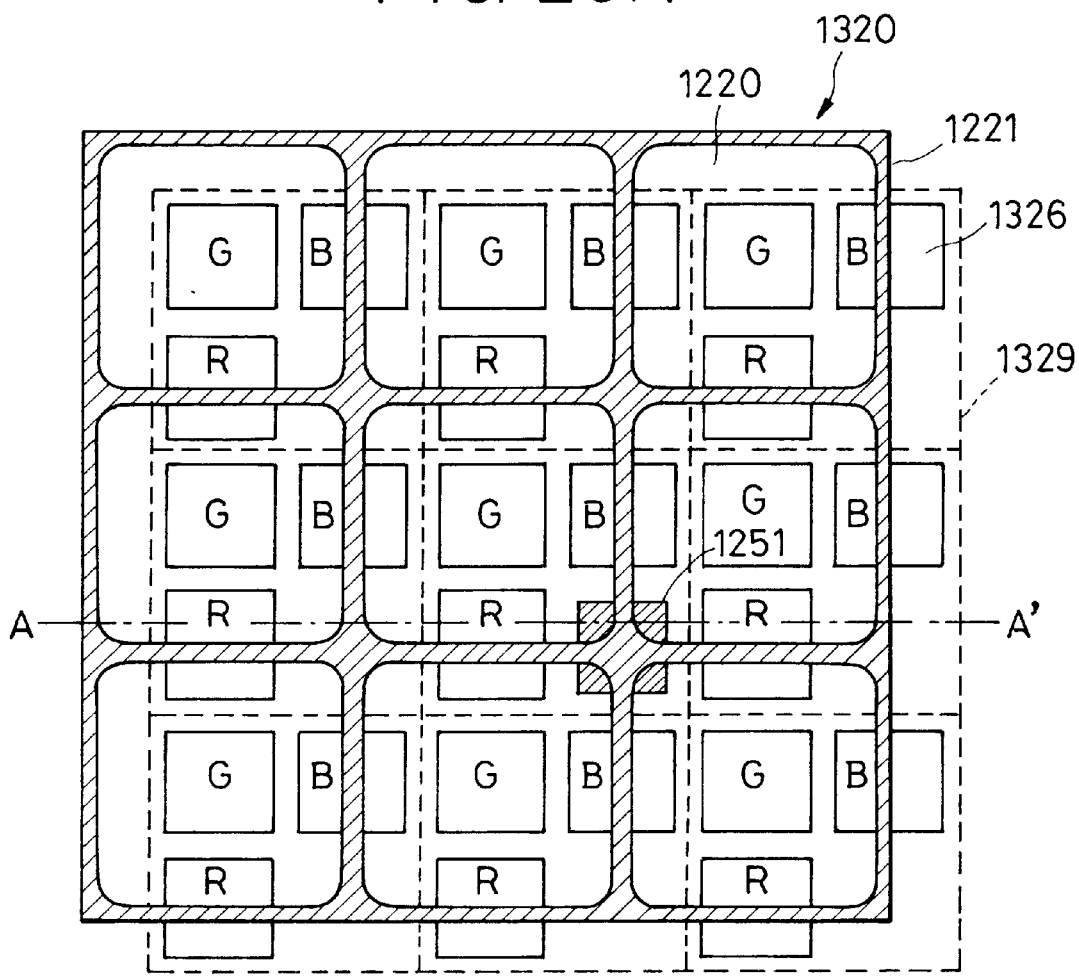
FIGS. 29A and 29B are a partially enlarged top view and a partially enlarged cross-sectional view of a liquid crystal panel of an embodiment according to the present invention.
Figure 29B:
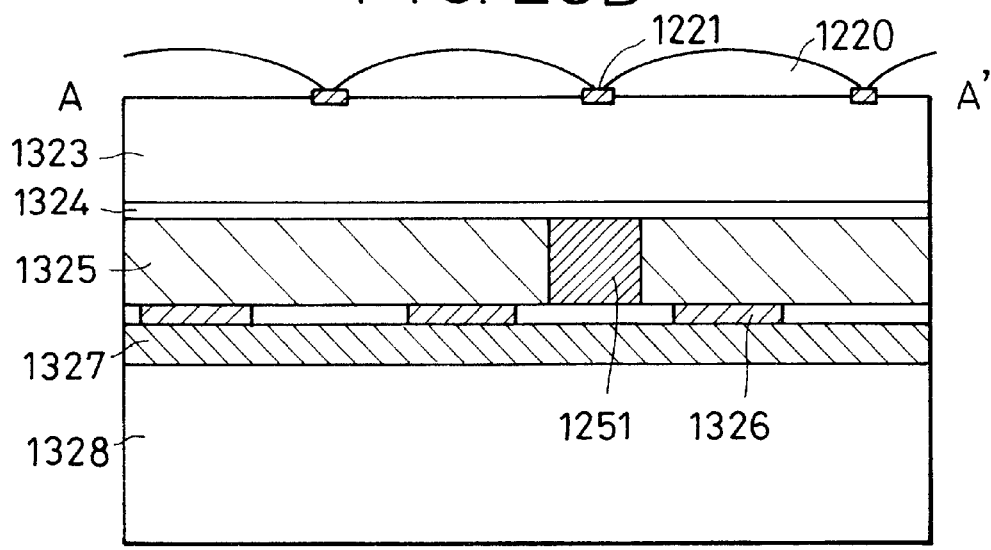

FIG. 28 is an enlarged partial cross-sectional view of a liquid crystal panel of an eighth embodiment in accordance with the present invention. In comparison with the seventh embodiment, a counter electrode 1323 is composed of a glass sheet, a microlens 1220 is composed of a thermoplastic resin and is formed on the counter electrode 1323 by a reflow process. Spacer columns 1251 at non-pixel sections are formed of a photosensitive resin by a photolithographic process. FIG. 29A is a partial top view of the liquid crystal panel 1320. As shown in FIG. 29A, spacer columns 1251 with a given pitch are formed in the non-pixel regions at the corner sections of microlens elements 1220. FIG. 29B is a cross-sectional view taken along the A—A' cross-section of FIG. 29A. It is preferred that the spacer columns 1251 be arranged with a pixel pitch of 10 to 100 in a matrix, in view of compatibility with the flatness of the glass sheet 1323 and injection of the liquid crystal. A shading layer 1221 of a patterned metallic film is provided in this embodiment to prevent light leakage from the boundary section of microlens elements. Thus, brightness and contrast of the projected image are further improved.

In the sixth to eighth embodiments for liquid crystal panels and projection-type liquid crystal display devices, the liquid crystal panels shown in the first to fifth embodiments display a high-quality image without distortion. Each of these panels has a higher aperture ratio and a lower coupling capacitance between reflecting electrodes of pixels, for example, a reflecting electrode for R, G, and B colors and the adjacent reflecting electrode.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A matrix substrate comprising a plurality of conductive members constituting pixels provided on a substrate, said plurality of conductive members forming substantially a smooth plane, wherein said matrix substrate further comprises a nonconductive section for insulating said plurality of conductive members from each other, the distance between two adjacent conductive members being less when measured at the upper surfaces of the conductive members than when measured at the lower surfaces of the conductive members in contact with the substrate.

2. A matrix substrate according to claim 1, wherein a ratio H/L of the height of the nonconductive members H to a distance L between two adjacent conductive members H is in a range of 0.2 to 1.0.

3. A matrix substrate according to claim 1, wherein a nonconductive film is disposed on the bottom surface of the conductive members, and further a conductive film is provided so as to be in contact with the surface of the nonconductive film.

4. A matrix substrate according to claim 3, wherein the dielectric constant of said nonconductive section is, smaller than the dielectric constant of the nonconductive film.

5. A matrix substrate according to claim 3, wherein the distance between two adjacent conductive members is larger than the thickness of the nonconductive film.

6. A matrix substrate according to claim 3, wherein said nonconductive section comprises a silicon oxide film.

7. A matrix substrate according to claim 3, wherein the nonconductive film comprises a silicon nitride film.

8. A matrix substrate according to claim 3, wherein the nonconductive film comprises a tantalum oxide film.

9. A matrix substrate according to claim 1, wherein said nonconductive section is formed of a plurality of materials.

10. A matrix substrate according to claim 3, wherein the nonconductive film comprises a plurality of materials.

11. A matrix substrate according to claim 3, wherein the conductive film is disposed on the bottom surface of said nonconductive section.

12. A matrix substrate according to claim 1, wherein said pixels are connected to switching transistors.

13. A matrix substrate according to claim 12, wherein each of the switching transistors comprises a CMOS device.

14. A liquid crystal device comprising a matrix substrate having conductive members constituting pixels provided on a substrate, said plurality of conductive members forming substantially a smooth plane, a counter substrate, and a liquid crystal material placed between said plurality of conductive members and said counter-substrates, wherein said matrix substrate further comprises a nonconductive section for insulating said plurality of conductive members from each other, the distance between two adjacent conductive members being less when measured at the upper surfaces of the conductive members than when measured at the lower surfaces of the conductive members in contact with the substrate.

15. A liquid crystal device according to claim 14, wherein a ratio H/L of the height of the nonconductive members H to a distance L between two adjacent conductive members H is in a range of 0.2 to 1.0.

16. A liquid crystal device according to claim 14, wherein a nonconductive film is disposed on the bottom surface of the conductive members, and further a conductive film is disposed so as to be in contact with the surface of the nonconductive film.

17. A liquid crystal device according to claim 16, wherein the dielectric constant of said nonconductive section is smaller that the dielectric constant of the nonconductive film.

18. A liquid crystal device according to claim 16, wherein the distance between two adjacent conductive members is larger that the thickness of the nonconductive film.

19. A liquid crystal device according to claim 16, wherein said nonconductive section comprises a silicon oxide film.

20. A liquid crystal device according to claim 16, wherein the nonconductive film comprises a silicon nitride film.

21. A liquid crystal device according to claim 16, wherein the nonconductive film comprises a tantalum oxide film.

22. A liquid crystal device according to claim 14, wherein said nonconductive section is formed of a plurality of materials.

23. A liquid crystal device according to claim 16, wherein the nonconductive film is formed of a plurality of materials.

24. A liquid crystal device according to claim 16, wherein the conductive film is disposed on the bottom surface of said nonconductive section.

25. A liquid crystal device according to claim 14, wherein said pixels are connected to switching transistors.

26. A liquid crystal device according to claim 25, wherein each of the switching transistors comprises a CMOS device.

27. A liquid crystal device according to claim 14, wherein a glass sheet is provided on said matrix substrate.

28. A liquid crystal device according to claim 27, wherein a plurality of microlenses are provided on the glass sheet.

29. A liquid crystal device according to claim 27, wherein one of the plurality of microlenses is provided for each three said pixels.

30. A projection-type liquid crystal display device comprising a liquid crystal display device according to claim 14.

31. A projection-type liquid crystal display device according to claim 30, comprising three liquid crystal display devices for projecting three color images, a high reflectance mirror and a blue-reflecting dichroic mirror for separating blue light and a red-reflecting dichroic mirror and a green/blue reflecting dichroic mirror for separating red light and green light.

32. A reflection-type liquid crystal display device comprising a liquid crystal display device according to claim 14.

* * * * *

UNITED STATES PATENT AND TRADEMARK OFFICE
CERTIFICATE OF CORRECTION

PATENT NO. : 6,356,332 B1
DATED : March 12, 2002
INVENTOR(S) : Takeshi Ichikawa et al.

It is certified that error appears in the above-identified patent and that said Letters Patent is hereby corrected as shown below:

<u>Title page, Item [54] and Column 1, line 5,</u>
Title, "BEING" should read -- IS --.

Item [56], U.S. PATENT DOCUMENTS,
"5,680,186 A * 10/1997 Watanable" should read -- 5,680,186 A * 10/1997 Watanabe --.

<u>Drawings,</u>
Figure 17, "SAFTY" should read -- SAFETY --.

<u>Column 1,</u>
Line 26, "demands" should read -- demand --; and
Line 31, "from" should read -- form --.

<u>Column 2,</u>
Line 60, "thorough" should read -- through --.

<u>Column 4,</u>
Line 20, "At a" should read -- As a --;
Line 24, "distance" should read -- distance L --;
Line 30, "each" should read -- each of --; and
Line 38, "cross sectional" should read -- cross-sectional --.

<u>Column 5,</u>
Line 57, "31 a" should read -- 31 is a --; and
Line 62, "EMBODIMENT" should read -- EMBODIMENTS --.

<u>Column 6,</u>
Line 28, "represented-by" should read -- represented by" --.

<u>Column 7,</u>
Line 6, "alluminum" should read -- aluminum --; and
Line 7, "tungusten" should read -- tungsten --.

UNITED STATES PATENT AND TRADEMARK OFFICE
CERTIFICATE OF CORRECTION

PATENT NO. : 6,356,332 B1
DATED : March 12, 2002
INVENTOR(S) : Takeshi Ichikawa et al.

It is certified that error appears in the above-identified patent and that said Letters Patent is hereby corrected as shown below:

Column 8,
Line 22, "and a" should read -- and an --;
Line 29, "capactive" should read -- capacitive --;
Line 31, "width H" should read -- width --;
Line 49, "Inter-pixel" should read -- inter-pixel --; and
Line 51, "be In" should read -- be in --.

Column 9,
Line 10, "the" should read -- each of the --;
Line 17, "a crystal" should read -- crystal --; and
Line 38, "pass" should read -- passes --.

Column 11,
Line 6, "phospho-tetraetoxysilane" should read -- phospho-tetraethoxysilane --.

Column 12,
Line 42, "resister" should read -- register --.

Column 13,
Line 37, "based" should read -- based on --.

Column 16,
Line 44, "reflection" should read -- reflection on --; and
Line 47, "collimated" should read -- are collimated --.

Column 18,
Line 43, "register, not" should read -- register (not -- and "drawing," should read -- drawing) --.

Column 19,
Line 19, "with" should be deleted and "interfere" should read -- interfere with --; and
Line 59, "emmited" should read -- emitted --.

UNITED STATES PATENT AND TRADEMARK OFFICE
CERTIFICATE OF CORRECTION

PATENT NO. : 6,356,332 B1
DATED : March 12, 2002
INVENTOR(S) : Takeshi Ichikawa et al.

It is certified that error appears in the above-identified patent and that said Letters Patent is hereby corrected as shown below:

Column 21,
Line 2, "not shown in the drawing" should read -- (not shown in the drawing) --; and
Line 7, "patternning" should read -- patterning -- and "pixalatin" should read
-- pixillating --.

Column 22,
Line 47, "counter-substrates," should read -- counter substrates, --; and
Line 66, "that" should read -- than --.

Column 23,
Line 3, "that" should read -- than --.

Signed and Sealed this

Eighteenth Day of March, 2003

JAMES E. ROGAN
*Director of the United States Patent and Trademark Office*